(12) United States Patent
Shigeta et al.

(10) Patent No.: US 8,799,896 B2
(45) Date of Patent: Aug. 5, 2014

(54) VIRTUAL SYSTEM CONTROL METHOD AND APPARATUS

(75) Inventors: Soichi Shigeta, Kawasaki (JP); Yuji Imai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 478 days.

(21) Appl. No.: 12/577,882

(22) Filed: Oct. 13, 2009

(65) Prior Publication Data

US 2010/0100881 A1 Apr. 22, 2010

(30) Foreign Application Priority Data

Oct. 22, 2008 (JP) .................................. 2008-271577

(51) Int. Cl.
*G06F 9/455* (2006.01)
*G06F 9/46* (2006.01)
*G06F 15/16* (2006.01)
*G06F 15/177* (2006.01)

(52) U.S. Cl.
USPC ............... 718/1; 718/100; 709/217; 709/220; 709/221; 709/222

(58) Field of Classification Search
None
See application file for complete search history.

(56) References Cited

U.S. PATENT DOCUMENTS

| 7,680,914 B2 | 3/2010 | Matsubara et al. | |
|---|---|---|---|
| 8,028,048 B2 | 9/2011 | Karve et al. | |
| 2004/0228290 A1* | 11/2004 | Graves ........................... | 370/257 |
| 2006/0184937 A1 | 8/2006 | Abels et al. | |
| 2006/0224930 A1* | 10/2006 | Bantz et al. ..................... | 714/48 |
| 2007/0250833 A1 | 10/2007 | Araujo et al. | |
| 2008/0120350 A1* | 5/2008 | Grabowski et al. ........... | 707/202 |
| 2009/0210873 A1* | 8/2009 | Cuomo et al. .................... | 718/1 |
| 2010/0088699 A1 | 4/2010 | Sasaki | |
| 2010/0100880 A1 | 4/2010 | Shigeta et al. | |
| 2010/0100881 A1 | 4/2010 | Shigeta et al. | |

FOREIGN PATENT DOCUMENTS

| JP | 4-195436 A | 7/1992 |
|---|---|---|
| JP | 8-235011 A | 9/1996 |
| JP | 9-330243 A | 12/1997 |

(Continued)

OTHER PUBLICATIONS

Japanese Office Action mailed Feb. 19, 2013 for corresponding Japanese Application No. 2008-271577, with English-language Translation.

(Continued)

*Primary Examiner* — Emerson Puente
*Assistant Examiner* — Jonathan R Labud
(74) *Attorney, Agent, or Firm* — Fujitsu Patent Center

(57) ABSTRACT

A virtual system control apparatus includes: a configuration information storage device to store configuration information for an operational system of a virtual system; a first virtual machine image storage device to store first virtual machine images for the operational system of the virtual system; a configuration change information storage device to store configuration change information that represents configuration information concerning difference between the operational system of the virtual system and plural types of test systems; a second virtual machine image storage device to store second virtual machine images for a virtual machine relating to the difference; and a controller. By adopting such data configuration of the operational system and the test system, it becomes possible to switch easily and smoothly between the operational system and the test system.

7 Claims, 25 Drawing Sheets

(56) References Cited

FOREIGN PATENT DOCUMENTS

| | | |
|---|---|---|
| JP | 2001-159988 A | 6/2001 |
| JP | 2005-346204 A | 12/2005 |
| JP | 2006-221649 A | 8/2006 |
| JP | 2007-299425 A | 11/2007 |
| JP | 2008-191907 A | 8/2008 |
| JP | 2010-102414 A | 5/2010 |
| JP | 2010-102415 A | 5/2010 |
| WO | WO-2008-117500 A1 | 10/2008 |

OTHER PUBLICATIONS

"U.S. Appl. No. 12/577,274 (related)," [CTNF] Non-Final Rejection issued on Jul. 3, 2013 (pending).

Japanese Office Action mailed Feb. 19, 2013 for corresponding Japanese Application No. 2008-271576, with English translation.

USPTO, (LABUD), "U.S. Appl. No. 12/577,274 (related)," [CTFR] Final Rejection issued on Apr. 24, 2014 (pending).

* cited by examiner

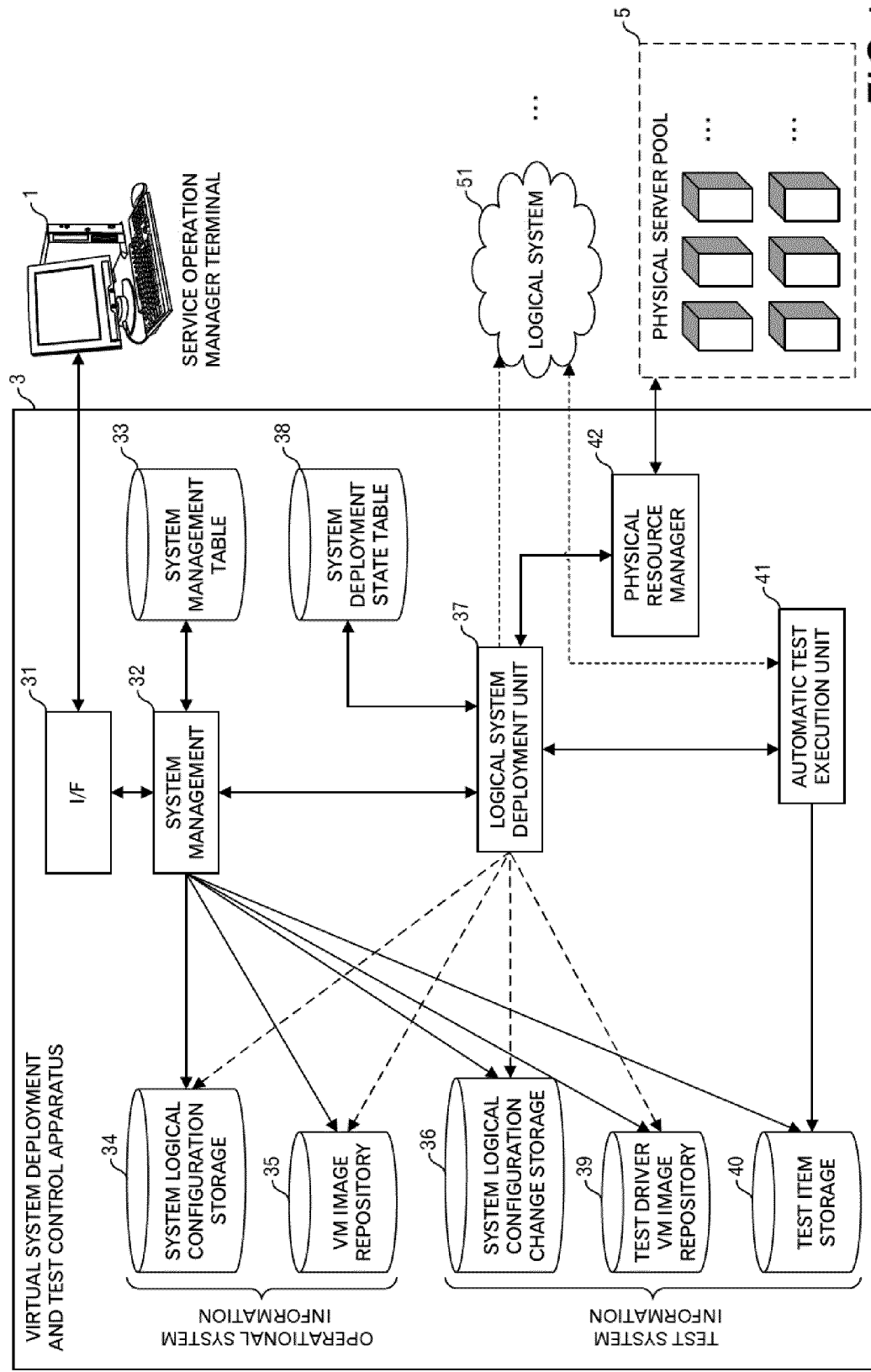

| SYSTEM NAME | CONFIGURATION INFORMATION OF OPERATIONAL SYSTEM | | CONFIGURATION CHANGE INFORMATION OF TEST SYSTEM | | |
|---|---|---|---|---|---|
| | NAME OF LOGICAL CONFIGURATION DEFINITION FILE | NAME OF VM IMAGE FILE | NAME OF LOGICAL CONFIGURATION CHANGE DEFINITION FILE | NAME OF TEST DRIVER VM IMAGE FILE | NAME OF TEST ITEM FILE |
| A | SysA.xml | A-Web.img<br>A-DB.img | SysA-OPERATION Test.xml<br>SysA-FUNCTIONAL_COVERAGE Test.xml<br>SysA-SECURITY Test.xml | A-TestClient-1.img<br>A-TestClient-2.img | SysA-OPERATION Test.xml<br>SysA-FUNCTIONAL_COVERAGE Test.xml<br>SysA-SECURITY Test.xml |
| X | SysX.xml | X-Web.img<br>X-DB.img | X-OPERATION TEST.test<br>X-FUNCTIONAL COVERAGE TEST.test<br>X-SECURITY TEST.test | X-TestDB.img<br>X-TestClient.img | X-OPERATION TEST.test<br>X-FUNCTIONAL COVERAGE TEST.test<br>X-SECURITY TEST.test |
| ... | ... | ... | ... | ... | ... |

FIG.5

| VIRTUAL SYSTEM NAME | CONFIGURATION DEFINITION |
|---|---|
| A | SysA.xml |
| B | SysB.xml |
| ⋮ | ⋮ |
| X | SysX.xml |

```xml
<?xml version="1.0"?>
<logical_struct xmlns="http://www.foo.bar.com/system">
  <logical_struct_name>system_A</logical_struct_name>
```
```
<!-- VM part -->
<server_list>
  <server name="web" pool="x86">
    <vm_image>web.img</vm_image>
    <min_instance>1</min_instance>
    <max_instance>5</max_instance>
    <default_instance>1</default_instance>
  </server>
  <server name="lb" pool="x86">
    <vm_image>lb.img</vm_image>
    <min_instance>1</min_instance>
    <max_instance>1</max_instance>
    <default_instance>1</default_instance>
  </server>
  <server name="db" pool="x86">
    <vm_image>db.img</vm_image>
    <min_instance>1</min_instance>
    <max_instance>2</max_instance>
    <default_instance>2</default_instance>
  </server>
</server_list>
```
← VIRTUAL MACHINE DESCRIPTION SECTION

```
<!-- network part -->
  <link_list>
    <link src="EXTERNAL-NET" dst="web">
      <outer_ip_address>@@gw-ip@@</outer_ip_address>
      <ip_address>@@web-ip@@:8080</ip_address>
    </link>
    <link src="web" dst="lb">
      <ip_address>@@lb-ip@@</ip_address>
    </link>
    <link src="lb" dst="db">
      <ip_address>@@db-ip@@</ip_address>
    </link>
  </link_list>
```
← NETWORK SETTING DESCRIPTION SECTION

```
</logical_struct>
```

FIG.7

| INSTANCE NAME OF VIRTUAL SYSTEM | PHYSICAL SERVER | STATE |
|---|---|---|
| A-OPERATIONAL | S01, S02 | IN SERVICE |
| A-TEST01 | S11, S12 | IN COVERAGE TEST |
| ⋮ | ⋮ | ⋮ |
| B-TEST (OPERATION PREPARING) | S35, S44, S76 | IN OPERATION TEST |
| ⋮ | ⋮ | ⋮ |
| X-OPERATIONAL | S03, S28 | DEPLOYING |

FIG.9

| SYSTEM NAME | LOGICAL CONFIGURATION CHANGE DEFINITION |
|---|---|
| A | SysA-OPERATION TEST.xml |
| | SysA-FUNCTIONAL TEST.xml |
| | SysA-SECURITY TEST.xml |
| B | SysB-OPERATION TEST.xml |
| | SysB-FUNCTIONAL TEST.xml |
| | SysB-SECURITY TEST.xml |
| ⋮ | ⋮ |
| X | SysX-OPERATION TEST.xml |
| | SysX-FUNCTIONAL TEST.xml |
| | SysX-SECURITY TEST.xml |

FIG.10

```xml
<?xml version="1.0"?>
<logical_struct xmlns="http://www.foo.bar.com/system">
  <logical_struct_name>system_A-
    test</logical_struct_name>
```

```xml
<!-- VM part -->
<!-- additional VMs for test -->
<server_list>
   <server name="test_client" pool="x86">
      <vm_image>test_client.img</vm_image>
      <min_instance>1</min_instance>
      <max_instance>10</max_instance>
      <default_instance>4</default_instance>
   </server>
   <server name="test_logger" pool="x86">
      <vm_image>test_logger.img</vm_image>
      <min_instance>1</min_instance>
      <max_instance>1</max_instance>
      <default_instance>1</default_instance>
   </server>
   <server name="test_db" pool="x86">
      <vm_image>test_db.img</vm_image>
      <min_instance>1</min_instance>
      <max_instance>2</max_instance>
      <default_instance>2</default_instance>
   </server>
</server_list>
```
← VIRTUAL MACHINE DESCRIPTION SECTION

```xml
<!-- network part -->
<!-- network connection settings to be omitted -->
<link_cut_list>
   <link src="EXTERNAL-NET" dst="web" />
   <link src="lb" dst="db" />
</link_cut_list>

<!-- network connection settings to be added -->
<link_add_list>
   <link src="test_client" dst="web">
      <ip_address>@@web-ip@@:8080</ip_address>
   </link>
   <link src="lb" dst="test_logger">
      <ip_address>@@test_logger-ip@@</ip_address>
   </link>
   <link src="lb" dst="test_db">
      <ip_address>@@test_db-ip@@</ip_address>
   </link>
</link_add_list>
```
← NETWORK SETTING DESCRIPTION SECTION

```xml
</logical_struct>
```

FIG.11

| SYSTEM NAME | TEST TYPE | TEST ITEM NAME | TEST CONTENT | RESULT |
|---|---|---|---|---|
| A | OPERATION TEST | AT001 | POSSIBLE TO OPEN LOG FILE | |
| | | AT002 | POSSIBLE TO COMMUNICATE VIA PORT No. x | |
| | | ⋮ | ⋮ | |
| | FUNCTIONAL COVERAGE TEST | FT001 | RETURN OUTPUT=0 FOR INPUT=y | |
| | | FT002 | RETURN OUTPUT=−1 FOR INPUT=z | |
| | | ⋮ | ⋮ | |
| | SECURITY TEST | ST001 | REJECT LOGIN OF PRIVILEGED USER | |
| | | ST002 | PORT No. m IS CLOSED | |
| | | ⋮ | ⋮ | |
| B | OPERATION TEST | AT001 | POSSIBLE TO ACCESS DB | |
| | | ⋮ | ⋮ | |
| | FUNCTIONAL COVERAGE TEST | FT001 | RETURN OUTPUT="OK" FOR INPUT=n | |
| | | ⋮ | ⋮ | |
| | SECURITY TEST | ST001 | FIREWALL IS "ON" | |
| | | ⋮ | ⋮ | |
| ⋮ | ⋮ | ⋮ | ⋮ | |
| X | OPERATION TEST | AT001 | POSSIBLE TO ACCESS PROXY SERVER | |
| | | ⋮ | ⋮ | |
| | FUNCTIONAL COVERAGE TEST | FT001 | REQUEST ADDITIONAL SERVER | |
| | | ⋮ | ⋮ | |
| | SECURITY TEST | ST001 | FIREWALL IS "ON" | |
| | | ⋮ | ⋮ | |

FIG.13

VIRTUAL SYSTEM CONTROL METHOD AND APPARATUS

CROSS-REFERENCE TO RELATED APPLICATIONS

This application is based upon and claims the benefit of priority of the prior Japanese Patent Application No. 2008-271577, filed on Oct. 22, 2008, the entire contents of which are incorporated herein by reference.

FIELD

This technique relates to a technique that enables to switch a virtual system between an operational system and a test system in one physical server pool including plural physical servers.

BACKGROUND

In an environment in which plural virtual machines are deployed on physical servers and a virtualized system is constructed by causing such plural virtual machines to cooperate each other through a network, it is desired that a test for the virtualized system (hereinafter, also called "virtual system") is effectively and efficiently carried out. At present, the development and test of such a virtual system are carried out by physically preparing an environment for the development and test. Typically, the scale of the environment for the development and test is smaller than an actually operational environment in which the virtual system will be actually operated, and the environment for the development and test is separated from the actually operational environment.

The physical separation between the actually operational environment and the environment for the development and test allows to exclude the danger of harmfully influencing the actually operational system by the system in the development and test (e.g. the trouble of the system in the development and test causes the stop or mis-operation of the actually operational system). However, there is a case where the actually operational environment is different from the environment for the development and test. For instance, the hardwares of the physical servers may be different, and the software versions of the Operating Systems (OS) or libraries may be different. Therefore, a lot of problems occurs such as troubles, which were not observed in the environment for the development and test, are discovered after the operation of the system in the actually operational environment started, and troubles occur due to the setting mistakes at porting the virtual system from the environment for the development and test to the actually operational environment occur.

Incidentally, various conventional arts exist for the virtual system. However, no technique pays attention to the aforementioned problem.

Recently, non-stop of the business service becomes a very important system requirement. Namely, necessity and importance increase in which the test after the configuration change (e.g. change of the number of virtual machines that cooperate each other, and application of the security patch) of the system is conducted without stopping the business service being actually operated, and the system after the configuration change is promptly made to be actually operated. However, at present, such a requirement is not satisfied. In addition, there is a case where the test for the operational system is desired. However, the dynamic logical configuration change of the virtual system cannot be treated. Furthermore, as for the logical configuration change of the virtual system, various settings are required in the conventional arts, and the load of the service operation manager is large. Therefore, there is possibility that the mis-operation occurs.

Furthermore, although the test typically includes various tests, it is inefficient that all of the tests have to be conducted. Namely, it is preferable that the minimum system test is conducted according to the operation situation of the virtual system.

Accordingly, there is no technique to easily switch the virtual system between the test systems for various types of tests and the operational system in one physical server pool including plural physical servers.

SUMMARY

According to a first aspect of this technique, a virtual system control method includes: receiving a deployment request for requesting to deploy a specific type of a test system for a specific virtual system in a physical server pool in which operational and test virtual systems can be deployed; activating a virtual machine necessary for the operational system of the specific virtual system in the physical server pool by using first server configuration data in configuration information for the operational system of the specific virtual system and a first virtual machine image for the operational system of the specific virtual system; activating a virtual machine to be added to the operational system of the specific virtual system in the physical server pool by using second server configuration data in configuration change information representing configuration information concerning difference between the operational system and the specific type of the test system for the specific virtual system and a second virtual machine image for the virtual machine relating to the difference; and carrying out a setting of a network connecting the activated virtual machines according to network configuration data generated by merging first network setting information between the virtual machines in the configuration information for the operational system of the specific virtual system and second network setting information that represents difference on the network between the operational system and the specific type of the test system for the specific virtual system and is included in the configuration change information.

According to a second aspect of this technique, a virtual system control method includes: receiving a deployment request for requesting to deploy an operational system of a specific virtual system in a physical server pool in which the operational and test virtual systems can be deployed; activating a virtual machine necessary for the operational system of the specific virtual system in the physical server pool by using first server configuration data in configuration information for the operational system of the specific virtual system and a first virtual machine image for the operational system of the specific virtual system; activating a virtual machine to be added to the operational system of the specific virtual system in the physical server pool by using second server configuration data in configuration change information representing configuration information concerning difference between the operational system and a specific type of the test system to be tested immediately before the operational system works and a second virtual machine image for the virtual machine relating to the difference; carrying out a setting of a network connecting the activated virtual machines according to network configuration data generated by merging first network setting information between the virtual machines in the configuration information for the operational system of the specific virtual system and second network setting information that represents difference on the network between the operational system and the specific type of the test system for the specific virtual system and is included in the configuration change information; and carrying out a specific test for the specific type of the test system to the specific virtual system; upon detecting that there is no problem in the specific test, stopping the activated virtual machines according to the first server configuration data included in the configuration change information, and returning the physical servers relating to the stopped virtual machines to the physical server pool; and carrying out a second setting of a network connecting the virtual machines that are still activated, according to the first network setting information in the configuration information.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a system configuration diagram of a virtual system deployment and test control apparatus in the embodiment of this technique;

FIG. 5 is a diagram depicting an example of a system management table;

FIG. 7 is a diagram depicting an example of data stored in a logical configuration definition file;

FIG. 9 is a diagram depicting an example of data stored in a system deployment state table;

FIG. 10 is a diagram depicting an example of data stored in system logical configuration change storage;

FIG. 11 is a diagram depicting an example of data stored in a logical configuration change definition file;

FIG. 13 is a diagram depicting an example of data stored in a test item storage;

DESCRIPTION OF EMBODIMENTS

Figure 1:
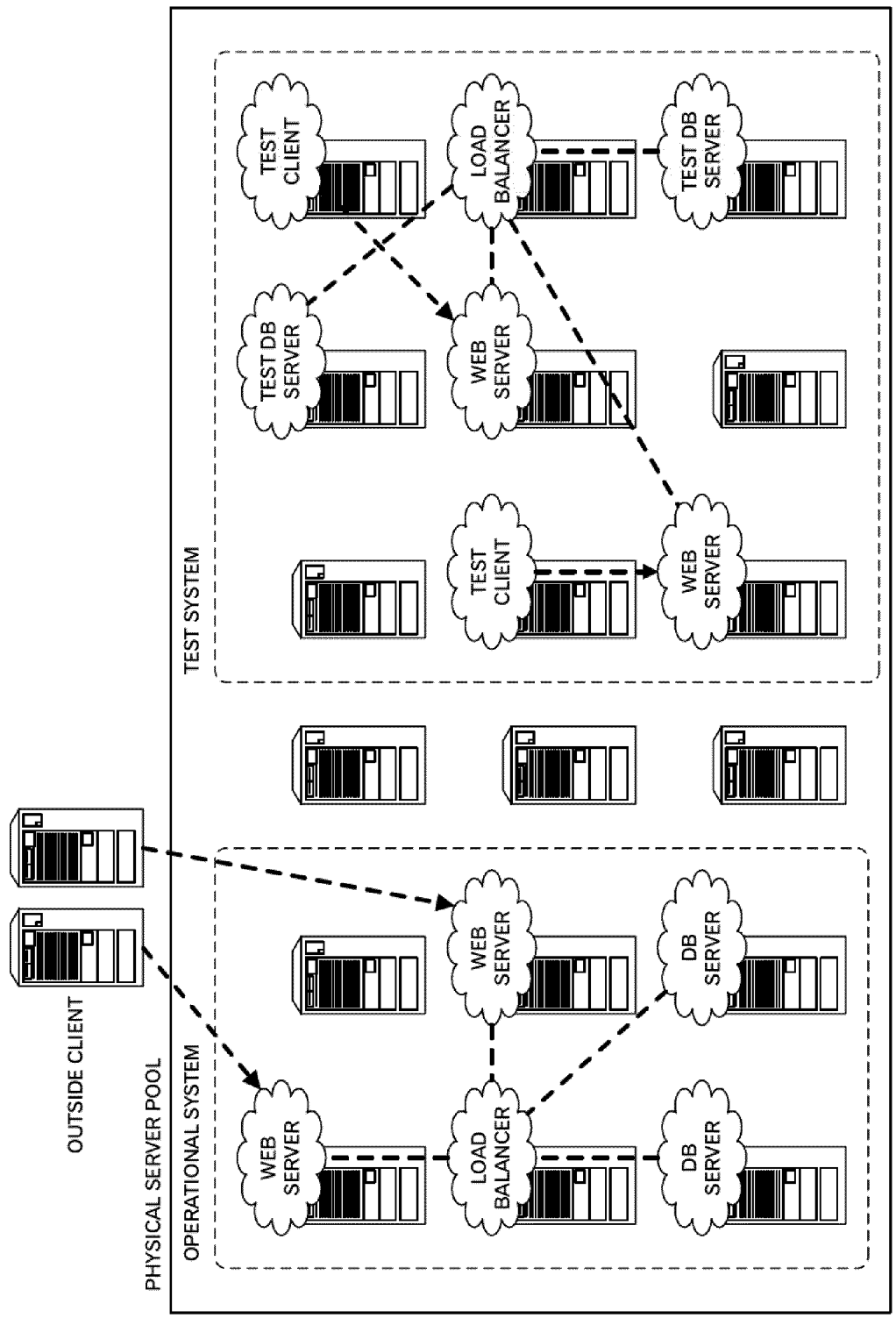
FIG. 1 is a schematic drawing depicting a premise in an embodiment of this technique.

In this embodiment of this technique, as depicted in FIG. 1, the operational system of the virtual system and the test system of the virtual system can exist together in one physical server pool including plural physical servers. Namely, in this embodiment, which is different from the conventional arts, the test system of the specific virtual system is not activated in another physical server pool, and the test system is also activated in the physical server pool in which the operational system can also be activated. As an example of FIG. 1, the test system including two Web servers, two test DB servers, two test clients and a load balancer exist together with the operational system including two Web servers, two DB servers and a load balancer. Incidentally, plural virtual machines may be activated on one physical server.

Figure 2:
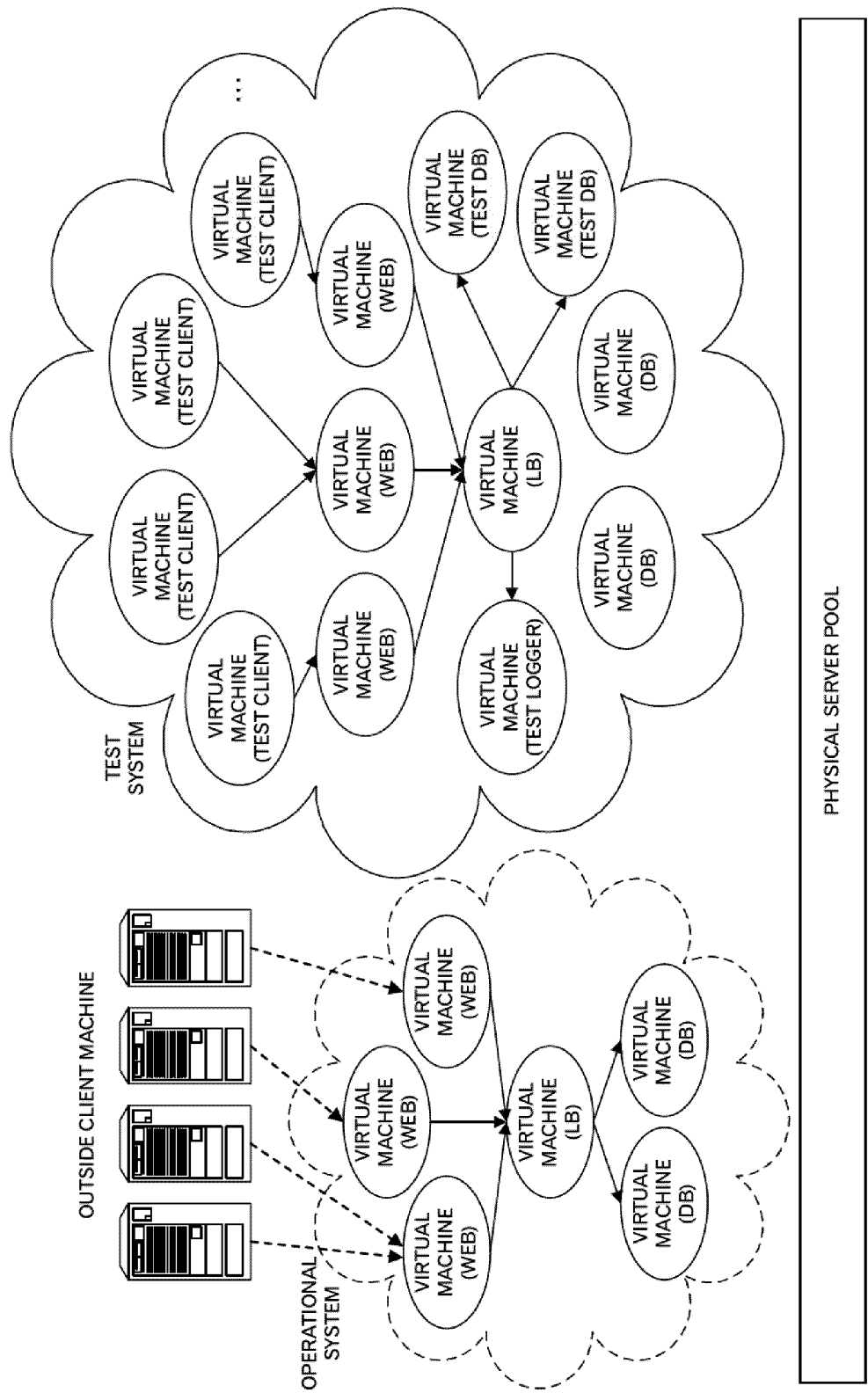
FIG. 2 is a schematic drawing depicting the premise in the embodiment of this technique.

Furthermore, in this embodiment of this technique, not only the operational system and the test system of the virtual system exist together, but also the configuration of the test system is contrived as depicted in FIG. 2. Namely, the operational system of the specific virtual machine includes three virtual machines for the Web server, one virtual machine for the load balancer (LB) and two virtual machines for the DB servers. Then, the test system of the specific virtual machine includes four virtual machines for the test client, one virtual machine for the test logger and two virtual machines for the test DB in addition to the same virtual machines as the operational system.

At this time, although two virtual machines for the DB server, which are included in the operational system, are activated, they are not used for the test and two virtual machines for the test DB are used on behalf of the two virtual machines for the DB server. Thus, the virtual machines for the test system are activated additionally to the virtual machines of the operational system. However, the network configuration of the test system, which is represented by arrows, is different from that of the operational system, and the network configuration for the test is adopted.

Thus, by making the virtual machine configuration of the test system in a form that the additional virtual machines are added to the virtual machine configuration of the operational system, the problem does not easily occur when converting from the test system to the operational system. Namely, the operational system is not defined separately from the test system, but the test system is defined by the difference with the operational system. Therefore, when defining and constructing the test system, the virtual machine configuration of the operational system has already been confirmed. Therefore, when the test for the test system is conducted and there is no problem, it is possible to deploy and operate the operational system soon. In addition, because the system conversion in the same physical server pool is carried out, any problem due to the difference of the configuration in the physical servers included in the physical server pool does not occur. Namely, the switching from the test system to the operational system can be carried out smoothly.

Furthermore, even when the test system is constructed, the virtual machines for the operational system has already been deployed. Therefore, it is possible to convert the virtual system from the test system to the operational system only by stopping unnecessary virtual machines and changing the network settings. Then, the setting mistakes or the like do not occur so much.

Figure 3:
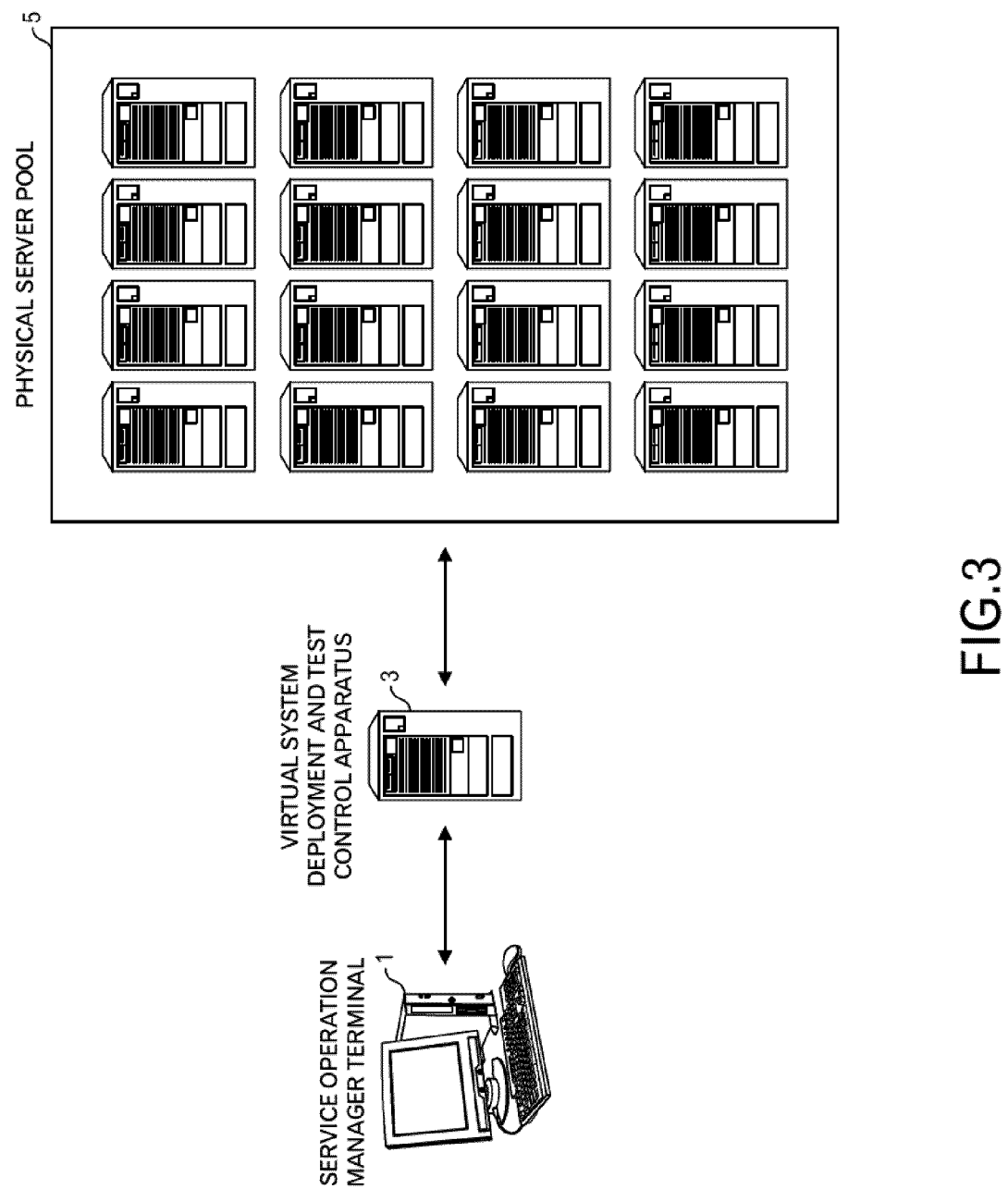
FIG. 3 is a system outline diagram in the embodiment of this technique.

Based on the aforementioned outline, FIG. 3 depicts a system outline in this embodiment. A service operation manager terminal 1 is connected with a virtual system deployment and test control apparatus 3. Furthermore, the virtual system deployment and test control apparatus 3 is connected to a physical server pool 5 including plural physical servers through a network.

FIG. 4 depicts the details of the virtual system deployment and test control apparatus 3 that carries out a main processing in this embodiment. The virtual system deployment and test control apparatus 3 has an I/F 31 that is an interface with the service operation manager terminal 1, a system manager 32, a system logical configuration storage 34, a Virtual Machine (VM) image repository 35, a logical system deployment unit 37, a system deployment state table 38, a system logical configuration change storage 36, a test driver VM image repository 39, an automatic test execution unit 41, a test item storage 40 and a physical resource manager 42. Incidentally, the system logical configuration storage 34 and VM image repository 35 store operational system information. In addition, the system logical configuration change storage 36, the test driver VM image repository 39 and the test item storage 40 store test system information.

The I/F 31 outputs data received from the service operation manager terminal 1 to the system manager 32, and outputs data received from the system manager 32 to the service operation manager terminal 1. The system manager 32 carries out data registration and data deletion to the system logical configuration storage 34, the VM image repository 35, the system logical configuration change storage 36, the test driver VM image repository 39 and the test item storage 40 according to the instructions from the service operation manager terminal 1. In addition, the system manager 32 manages data registered in the aforementioned data storage units by using the system management table 33. Furthermore, the system manager 32 cooperates with the logical system deployment unit 37.

The logical system deployment unit 37 manages the system deployment state table 38, and deploys a logical system 51 on the physical machine secured in the physical server pool 5 by using data stored in the system logical configuration storage 34, the VM image repository 35, the system logical configuration change storage 36 and the test driver VM image repository 39, and also carries out a processing to dismantle the virtual machine and the like. The logical system deployment unit 37 cooperates with the physical resource manager 42 and the automatic test execution unit 41.

The physical resource manager 42 carries out a processing to secure or release the physical servers on the physical server pool according to instructions from the logical system deployment unit 37. Incidentally, the processing content of the physical resource manager 42 is the same as that of the conventional arts.

Furthermore, the automatic execution unit 41 executes the tests for the test items registered in the test item storage 40 against the logical system 51 according to instructions from the logical system deployment unit 37, and outputs test results to the logical system deployment unit 37. Incidentally, the processing content of the automatic test execution unit 41 is the same as that of the conventional arts.

An example of data stored in the system management table 33 is depicted in FIG. 5. In the system management table 33, for each virtual system, a file name of a logical configuration definition file and VM image files, which are used as configuration information of the operational system, are registered, and filenames of logical configuration change definition files and test driver VM image files, which are used as configuration change information of the test system, are registered. In this embodiment, plural tests are defined, and for each test type, the logical configuration change definition file is prepared. Therefore, the file name of the logical configuration change definition file is registered, for each test type, also in the system management table 33. Similarly, file names of test item files used for the test of the test system are also registered for each virtual system and each test type. Incidentally, the file names of the test driver VM image files may be defined for each test type. Furthermore, when there is definition in the logical configuration change definition file, the file name of the test driver VM image file may not be defined in the system management table 33.

Figures 6, 8:
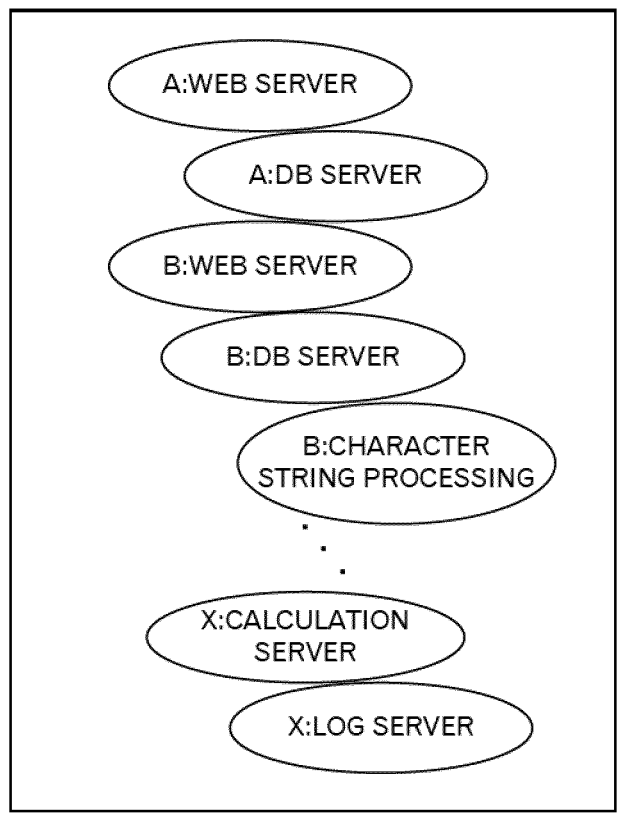
FIG. 6 is a diagram depicting an example of data stored in a system logical configuration storage.
FIG. 8 is a diagram schematically depicting data stored in a VM image repository.

An example of data stored in the system logical configuration storage 34 is depicted in FIG. 6. In the system logical configuration storage 34, for each virtual system, a logical configuration definition file for the operational system is registered. The logical configuration definition file includes data depicted in FIG. 7, for example. The logical configuration definition file depicted in FIG. 7 is described in XML, and includes a virtual machine description section and a network setting description section. The virtual machine description section includes a list of servers, and for each server, a name (e.g. Web, lb, db or the like) of the server, a VM image file name (e.g. Web.img, lb.img, db.img or the like), the minimum number of instances, the maximum number of instances, and the default number of instances are registered. Incidentally, an attribute pool="x86" represents a processor type of the physical server to be secured. In addition, the network setting description section includes a list of links, and for each link, a source node name (e.g. EXTERNAL-NET or Web), a destination node name (e.g. lb (load balancer) or db), and an IP address are registered. Incidentally, when the source node name represents the outside network, the IP address of a gateway, which is a connection point with the outside network, is also registered.

In addition, a schematic diagram of data stored in the VM image repository 35 is depicted in FIG. 8. In the VM image repository 35, an image file of the image file name registered in the column of the name of the VM image file in the system management table 33 is registered. In addition, all of the image files for the virtual machines, which are listed in the configuration definition file, are registered. In an example of FIG. 8, for example, "A: Web server" represents an image file for the Web sever of the virtual system A.

In addition, an example of data stored in the system deployment state table 38 managed by the logical system deployment unit 37 is depicted in FIG. 9. In the example of FIG. 9, an instance name ("a type of the virtual system"+"an instance name" (operational or (test and test type)+number)) of the virtual system managed by the logical system deployment unit 37, an identifier of the secured physical server and a state (e.g. in service, in coverage test, in operation test, deployed, in dismantling) are registered.

Next, an example of data stored in the system logical configuration change storage 36 is depicted in FIG. 10. The system logical configuration change storage 36 stores, for each virtual system and each test type, a logical configuration change definition file for a corresponding test type of the test system. The logical configuration change definition file includes data as depicted in FIG. 11, for example. The logical configuration change definition file includes a virtual machine description section in which the virtual machines to be deployed and activated in addition to the virtual machines listed in the virtual machine description section in the logical configuration definition file are listed, and a network setting description section including: links to be added and links to be deleted among the links listed in the network setting description section of the logical configuration definition file. In the logical configuration change definition file, the description method of the virtual machine description section is the same as that of the logical configuration definition file. On the other hand, as for the network setting description section, points different from the logical configuration definition file is as follows: a cut list for links to be deleted and an add list for links to be added are separated, and only the link type to be cut is designated in the cut list. However, the description method of the add list is the same as that of the network setting description section in the logical configuration definition file.

Figure 12:
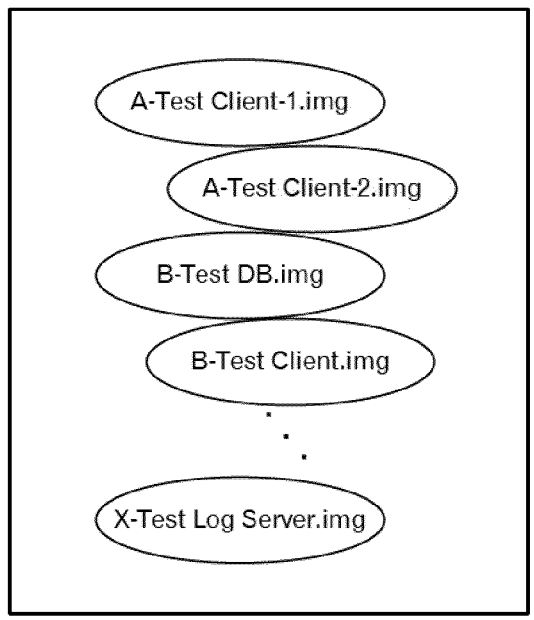
FIG. 12 is a diagram schematically depicting data stored in a test driver VM image repository.

In addition, data stored in the test driver VM image repository 39 is schematically depicted in FIG. 12. The test driver VM image repository 39 stores images files whose file name is registered in the column of the name of the test driver VM image file in the system management table 33. In addition, all image files for the virtual machines, which are listed in the logical configuration change definition file, are registered.

Furthermore, data as depicted in FIG. 13 is registered in the test item storage 40. In an example of FIG. 13, a table stores, for each of the virtual systems and for each test type, test items name and test contents. Although the test data for all virtual machines is depicted in FIG. 13 as the table, it is registered for each of the virtual machines and for each test type as the test item file. Moreover, although FIG. 13 depicts only an operation test that is carried out before operating the operational system, a functional coverage test and a security test, more types of test may be defined. In addition, for each virtual system, the test type may be changed. The success or failure of the test are registered when the test has been completed. However, because the test result is transmitted by the automatic test execution unit 41 through the system manager 32 and the I/F 31 to the service operation manager terminal 1, the test result may not be held in the test item storage 40.

Next, a processing content of the system depicted in FIGS. 3 and 4 will be explained by using FIGS. 14 to 28. First, when the service operation manager inputs a deployment instruction of a specific virtual system X, which includes designation of the operational system or test system and designation of the test type if the test system is designated, the service operation manager terminal 1 accepts the deployment instruction of the specific virtual system X, which includes the designation of the operational system or test system and the test type, and issues to the virtual system deployment and test control apparatus 3, a deployment command of the virtual system X, which includes the designation of the operational system or test system and the test type (step S1). When the I/F 31 of the virtual system deployment and test control apparatus 3 receives the deployment command of the virtual system X, which includes the designation of the operational system or test system and the test type, the I/F 31 outputs the deployment command to the system manager 32. The system manager 32 receives the deployment command of the virtual system X, which includes the aforementioned designation, extracts configuration information pertinent to this deployment command, and outputs a deployment instruction of the virtual system X, which includes the extracted configuration information, to the logical system deployment unit 37 (step S3). In a case of the deployment of the operational system of the virtual system X, the system manager 32 extracts, as the configuration information, the file name of the logical configuration definition file for the virtual system X, the file name of the VM image file, the file name of the logical configuration change definition file for the operation test, the file name of the test driver VM image file for the operation test and the file name of the test item file for the operation test, from the system management table 33, and outputs the extracted data to the logical system deployment unit 37. On the other hand, in a case of the deployment of the designated test type of the test system for the virtual system X, the system manager 32 extracts, as the configuration information, the file name of the logical configuration definition file for the virtual system X, the file names of the VM image files, the file name of the logical configuration change definition file for the designated test type, the file names of the test driver VM image files for the designated test type, and the file name of the test item file of the designated test type, from the system management table 33, and outputs the extracted data to the logical system deployment 37.

The logical system deployment unit 37 receives the deployment instruction of the virtual system X, which includes the configuration information, from the system manager 32, identifies the logical configuration definition file in the system logical configuration storage 34 according to the received configuration information, and identifies the required number of physical servers for the operational system according to the virtual machine description section in the logical configuration definition file, and requests the physical resource manager 42 to allocate the identified number of physical servers (step S5). Because the logical configuration definition file in FIG. 7 defines the default number of Web servers is "1", the default number of load balancer is "1" and the default number of DB servers is "2", the allocation of the total four physical servers are requested. Incidentally, the logical system deployment unit 37 adds a record relating to the received deployment instruction, in the system deployment state table 38. For example, when the test system of the security test for the virtual system X is deployed, a record is added, which includes the instance name "X-test (security test)" of the virtual system, "undecided" for the physical server and "in deploying" for the state. In addition, when the operational system of the virtual system X is deployed, the operation test as described below is previously carried out. Therefore, a record is added, which includes the instance name "X-test (operation test)", "undecided" for the physical server and "in deploying" for the state.

The physical resource manager 42 receives the request to allocate the physical servers from the logical system deployment unit 37, and carries out the allocation of the physical servers in the physical server pool 5 according to the request (step S7). Because this processing is the same as the conventional one, no further explanation is made. Incidentally, when the necessary physical servers can be secured, the physical resource manager 42 notifies the logical system deployment unit 37 of information concerning which physical server is secured. The logical system deployment unit 37 registers the names of the secured physical servers into the pertinent record of the system deployment state table 38.

When the necessary physical servers could not be secured (step S9: No route), the processing shifts to a processing of FIG. 15 through a terminal A. On the other hand, when the necessary physical servers could be secured (step S9: Yes route), the processing shifts to a processing of FIG. 16 through a terminal B.

Figure 15:
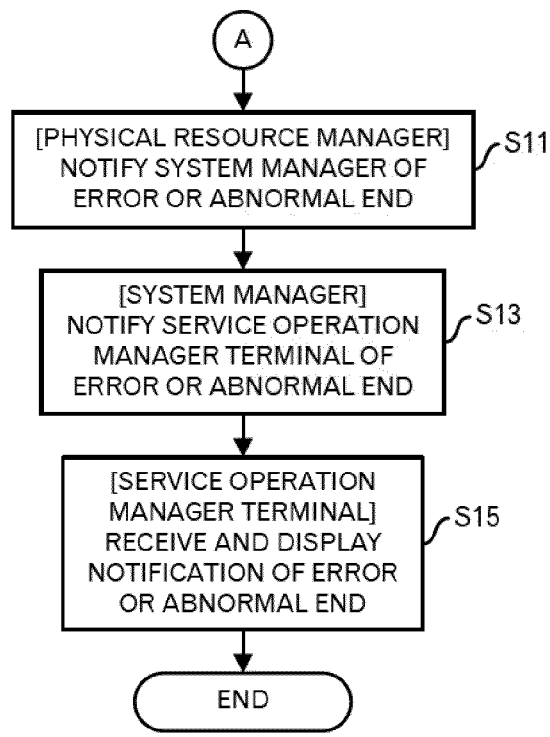
FIG. 15 is a diagram depicting a processing flow in the embodiment.
Figure 14:
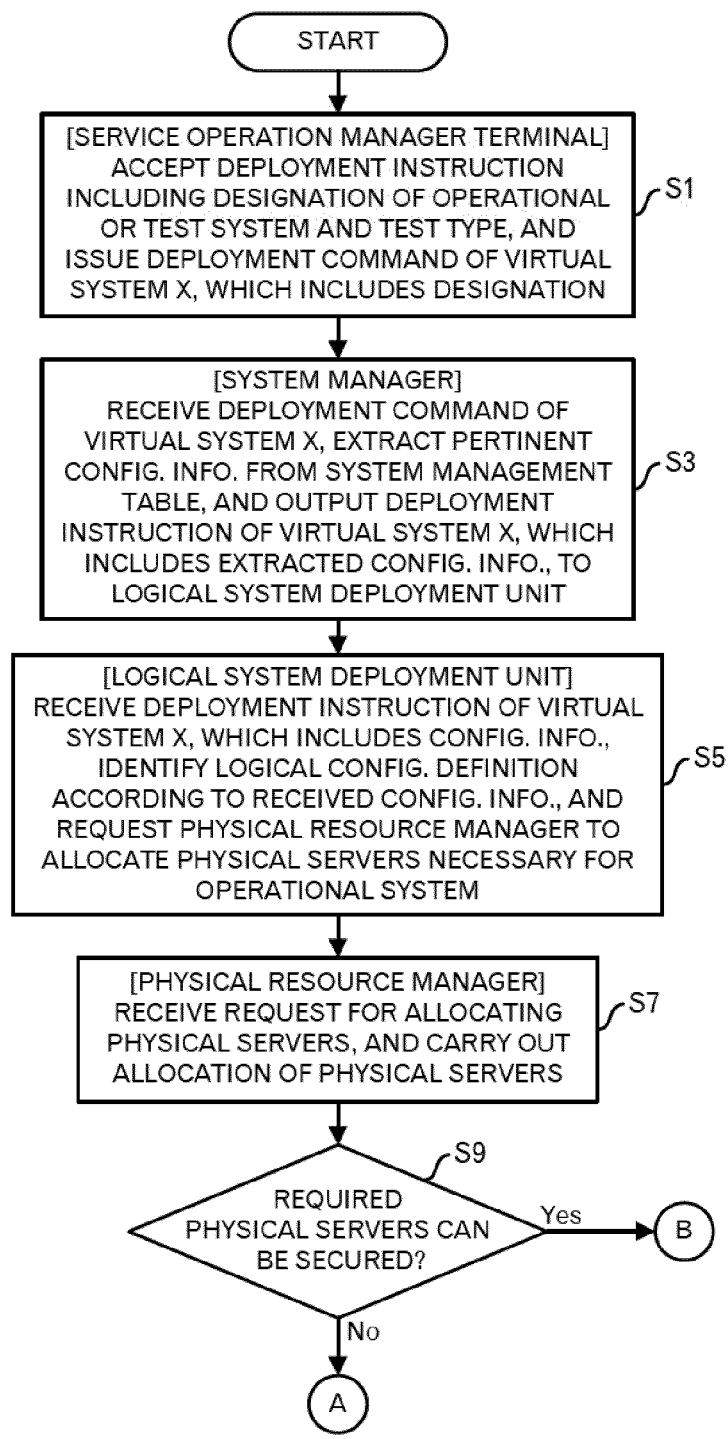
FIG. 14 is a diagram depicting a processing flow in the embodiment.

When all of the necessary physical servers could not be secured, the physical resource manager 42 notifies the system manager 32 of an error or abnormal end through the logical system deployment unit 37 (FIG. 15: step S11). Incidentally, the physical servers already secured for the request are released. When the logical system deployment unit 37 receives the error or abnormal end, the logical system deployment unit 37 transfers the notification to the system manager 32, and deletes the pertinent record in the system deployment state table 38. The system manager 32 notifies the service operation manager terminal 1 of the error or abnormal end through the I/F 31 (step S13). When the service operation manager terminal 1 receives the notification of the error or abnormal end from the virtual system deployment and test control apparatus 3, the service operation manager terminal 1 notifies the service operation manager by, for example, displaying the notification on the display device (step S15). Then, the processing is terminated.

On the other hand, when the necessary physical servers could be secured, the logical system deployment unit 37 extracts the pertinent VM image files from the VM image repository 35 according to the file names of the VM image files, which are included in the received configuration information, and deploys and activates the virtual machines by loading the VM images onto the allocated physical servers (step S17). Thus, in case of the deployment of the simple operational system, the activation of the necessary virtual machines is completed. However, in this embodiment, after the operation test is completed for the operational system, the normal operation of the operational system starts. Therefore, the further processing describe below is required. On the other hand, in case of the deployment of the test system, the activation of a portion of the virtual machines is completed.

Here, when the instruction of the service operation manager indicates the deployment of the operational system (step S19: Yes route), the logical system deployment unit 37 reads out the pertinent logical configuration change definition file from the system logical configuration change storage 36 according to the file name of the logical configuration change definition file for the operation test, which is included in the received configuration information, identifies the number of physical servers to be added to the operational system from the virtual machine description section of the read logical configuration change definition file, and requests the physical resource manager 42 to allocate the required physical servers (step S21).

When the physical resource manager 42 receives an allocation request of the identified number of physical servers from the logical system deployment unit 37, the physical resource manager 42 carries out the allocation of the physical servers in the physical server pool 5 according to the request (step S23). Incidentally, when the required number of physical servers could be secured, the physical resource manager 42 notifies the logical system deployment unit 37 of information as to which of the physical servers could be secured. The logical system deployment unit 37 registers the names of the secured physical servers into the pertinent record of the system deployment state table 38.

Here, when the required number of physical servers could not be secured (step S25: No route), the processing shifts to a processing of FIG. 15 through a terminal A. On the other hand, when the required number of physical servers could be secure (step S25: Yes route), the processing shifts to a processing of FIG. 18 through a terminal C.

When the instruction of the service operation manager indicates the deployment of the designated test type of the test system (step S19: No route), the logical system deployment unit 37 reads out the pertinent logical configuration change definition file from the system logical configuration change storage 36 according to the file name of the logical configuration change definition file for the designated test, which is included in the received configuration information, identifies the number of physical servers to be added to the operational system from the virtual machine description of the read logical configuration change definition file, and requests the physical resource manager 42 to allocate the required number of physical server (step S27).

The physical resource manager 42 receives the request to allocate the identified number of physical servers from the logical system deployment unit 37, and carries out the allocation of the physical servers in the physical server pool 5 according to the request (step S29). When the required number of physical servers could be secured, the physical resource manager 42 notifies the logical system deployment unit 37 of information as to which of the physical servers was secured. The logical system deployment unit 37 registers the names of the secured physical servers into the pertinent record in the system deployment state table 38.

Here, when the required number of physical servers could not be secured (step S31: No route), the processing shifts to the processing of FIG. 15 through the terminal A. On the other hand, the required number of physical servers could be secured (step S31: Yes route), the processing shifts to a processing of FIG. 22 through a terminal D.

Figure 17:
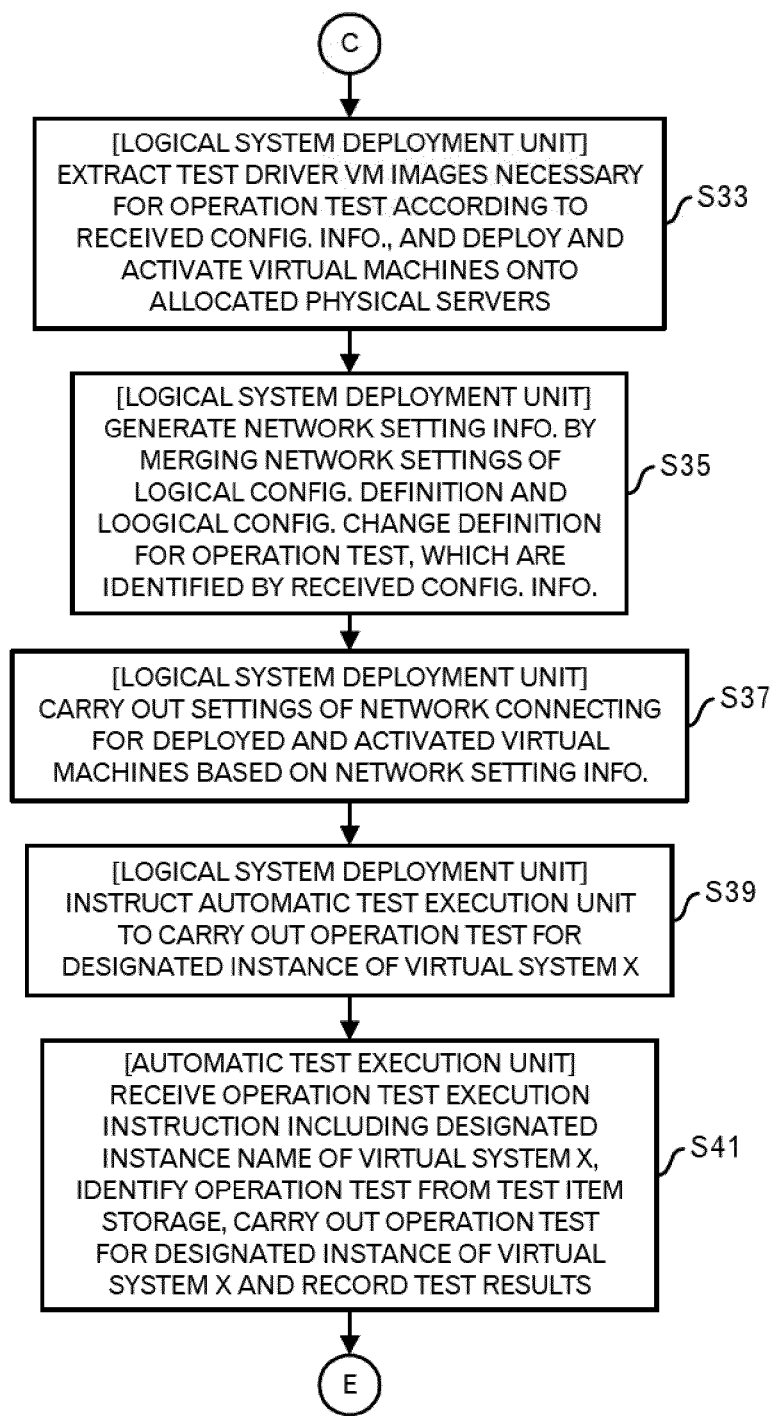
FIG. 17 is a diagram depicting a processing flow in the embodiment.

Shifting to the explanation of the processing in FIG. 17 after the terminal C, the logical system deployment unit 37 identifies the logical configuration change definition file for the operation test from the system logical configuration change storage 36 according to the file name of the logical configuration change definition file for the operation test, which is included in the received configuration information, reads out the pertinent test driver VM image files from the test driver VM image repository 39 according to the file names of the test driver VM image files, which are included in the received configuration information, and deploys and activates the virtual machines by loading the read test driver VM image files onto the allocated physical servers according to the virtual machine description section of the logical configuration change definition file for the operation test (step S33).

Furthermore, the logical system deployment unit 37 merges the network setting description section of the logical configuration definition file identified from the received configuration information and the network setting description section in the logical configuration change definition file to generate the network setting information for the test system for the operation test, and stores the generated network setting information into a storage device such as a main memory (step S35). The example of FIG. 7 defines a link (1*a*) between the outside network and the Web server, a link (2*a*) between the Web server and the load balancer lb and a link (3*a*) between the load balancer lb and the DB server. In addition, the example of FIG. 11 defines, as a cut list, a link (1*b*) between the outside network and the Web server and a link (2*b*) between the load balancer lb and the DB server, and defines, as an add list, a link (1*c*) between the test client and the Web server, a link (2*c*) between the load balancer lb and the test logger and a link (3*c*) between the load balancer lb and the test DB server. Therefore, the link (1*a*) is deleted by the link (1*b*) and the link (3*a*) is deleted by the link (2*b*). Therefore, the remaining links are links (2a), (1c), (2c) and (3c). These links are links included in the generated network setting information.

Thus, because the test system cannot be constructed only by simply adding the links to the operational system, the aforementioned merge processing is carried out in order to resolve the difference of the network configuration. However, the appropriate test system cannot be constructed unless the network setting description section of the logical configuration file and the network setting description section of the logical configuration change definition file are defined in such a form that both of them are conformed each other. Namely, when an unappropriate portion is included in the network setting description section of the logical configuration file or the network setting description section of the logical configuration change definition file, the test for the test system cannot be executed. Therefore, when the test for the test system is successfully conducted, the possibility that the operational system also works without any problem becomes very high.

Then, the logical system deployment unit 37 carries out settings of the network for the deployed and activated virtual machines based on the network setting information generated at the step S35 (step S37). By doing so, the logical system 51 before the operational stage has been constructed on the physical server pool 5. Therefore, the logical system deployment unit 37 changes the state of the pertinent record in the system deployment state table 38 to "deployed", for example. Incidentally, the details of this processing is the same as the conventional arts. Therefore, any further explanation is omitted.

After that, the logical system deployment unit 37 designates the file name of the test item file for the operation test, which is included in the received configuration information to the automatic test execution unit 41, and instructs the automatic test execution unit 41 to start the test for the instance of the test system for the operation test for the virtual system X (step S39). The automatic test execution unit 41 receives an operation test start instruction including the file name of the test item file for the operation test and the instance name of the virtual system X, reads out the test item file of the designated file name from the test item storage 40, carries out the test according to the test item file, and stores the test results into the storage device such as the main memory (step S41). The performance itself of the test according to the test item file is the same as the conventional arts. Therefore, the further explanation is omitted. Incidentally, the logical system deployment unit 37 changes the state of the pertinent record in the system deployment state table 38 to "in test". The processing shifts to the processing of FIG. 18 through a terminal E.

Figure 18:
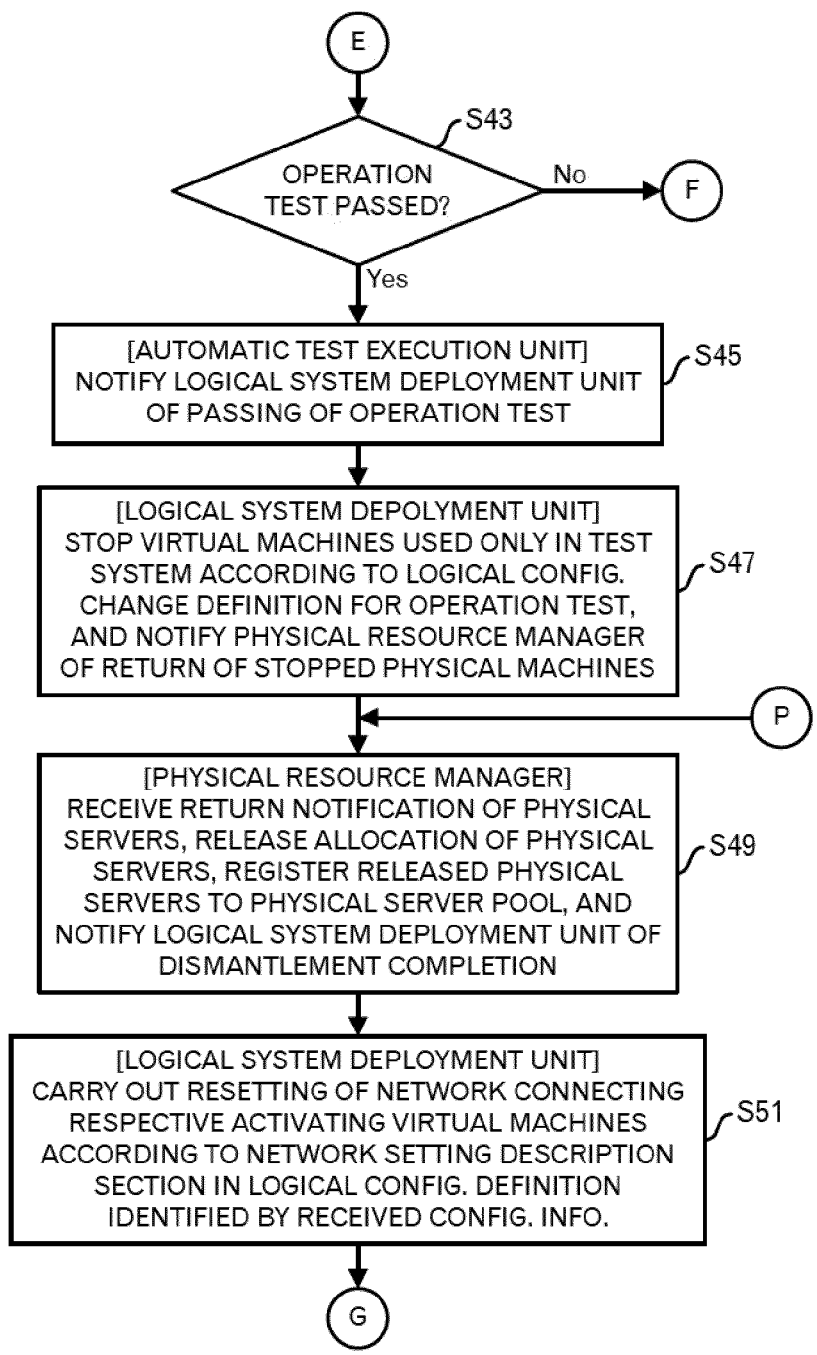
FIG. 18 is a diagram depicting a processing flow in the embodiment.

Shifting to the explanation of the processing of FIG. 18, when the operation test of the deployed test system of the virtual system X is failed (step S43: No route), the processing shifts to a processing of FIG. 21 through a terminal F.

On the other hand, when the operation test is successfully completed (step S43: Yes route), the automatic test execution unit 41 notifies the logical system deployment unit 37 of passing the operation test (step S45). The logical system deployment unit 37 receives the notification of passing the operation test from the automatic test execution unit 41, stops the virtual machines used only for the test system for the operation test according to the virtual machine description section in the logical configuration change definition file for the operation test, and notifies the physical resource manager 42 of the return of the physical servers relating to the stopped virtual machines (step S47). The processing to stop the virtual machine is the same as the conventional arts. Therefore, the further explanation is omitted. Incidentally, at this stage, the state of the pertinent record in the system deployment state table 38 is changed to "shifting to operation", for example. By such a processing, only the virtual machines included in the operational system are being activated.

The physical resource manager 42 receives the notification of the return of the physical servers from the logical system deployment unit 37, releases the allocation of the physical servers relating to the stopped virtual machines, registers the physical servers as being free into the physical server pool 5, and notifies the logical system deployment unit 37 of the dismantlement completion (step S49).

When the logical system deployment unit 37 receives the notification of the dismantlement completion from the physical resource manager 42, the logical system deployment unit 37 carries out a re-setting of the network connecting the respective activated virtual machines according to the network description section of the logical configuration definition file identified by the received configuration information (step S51). Thus, the network setting necessary for the normal operation of the virtual machines included in the operational system has been conducted, and the switching from the test system for the operation test to the operational system has been made. Therefore, the instance name in the pertinent record in the system deployment state table 38 is changed to "X-operational", for example, and the state is changed to "deploying" or "waiting". The processing shifts to a processing of FIG. 19 through a terminal.

Figure 19:
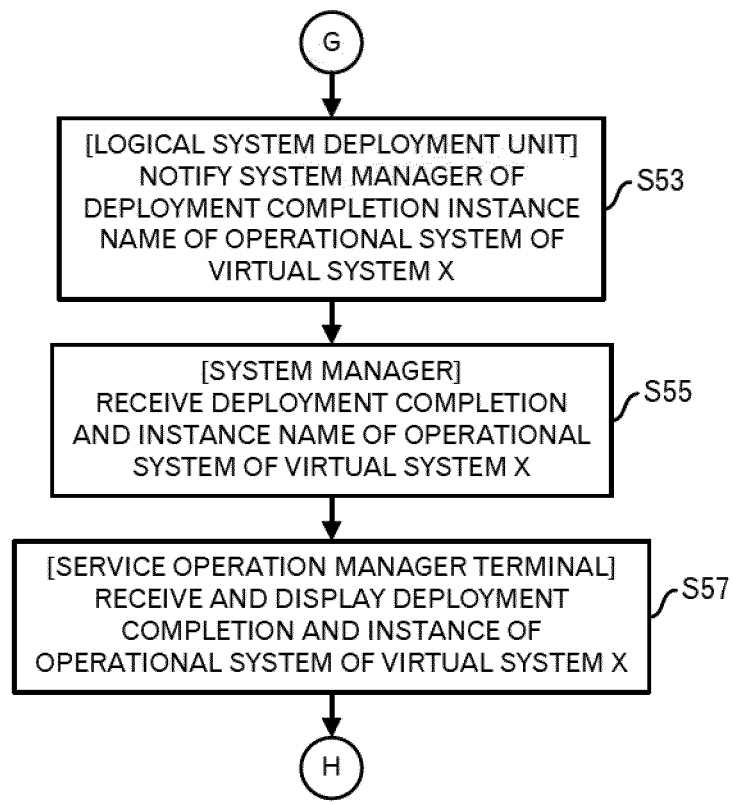
FIG. 19 is a diagram depicting a processing flow in the embodiment.

Shifting to the explanation of the processing of FIG. 19, the logical system deployment unit 37 notifies the system manager 32 of the deployment completion and the instance name of the operational system of the virtual system X (step S53). The system manager 32 receives the notification of the deployment completion and the instance name of the operational system of the virtual system X, and transfers the notification to the service operation manager terminal 1 through the I/F 31 (step S55). The service operation manager terminal 1 receives the notification of the deployment completion and the instance name of the operational system of the virtual system X from the virtual system deployment and test control apparatus 3, and displays the notification onto the display device (step S57). Thus, the service operation manager can recognize the completion of the deployment of the operational system after passing the operational test. The processing shifts to a processing of FIG. 20 through a terminal H.

Figure 20:
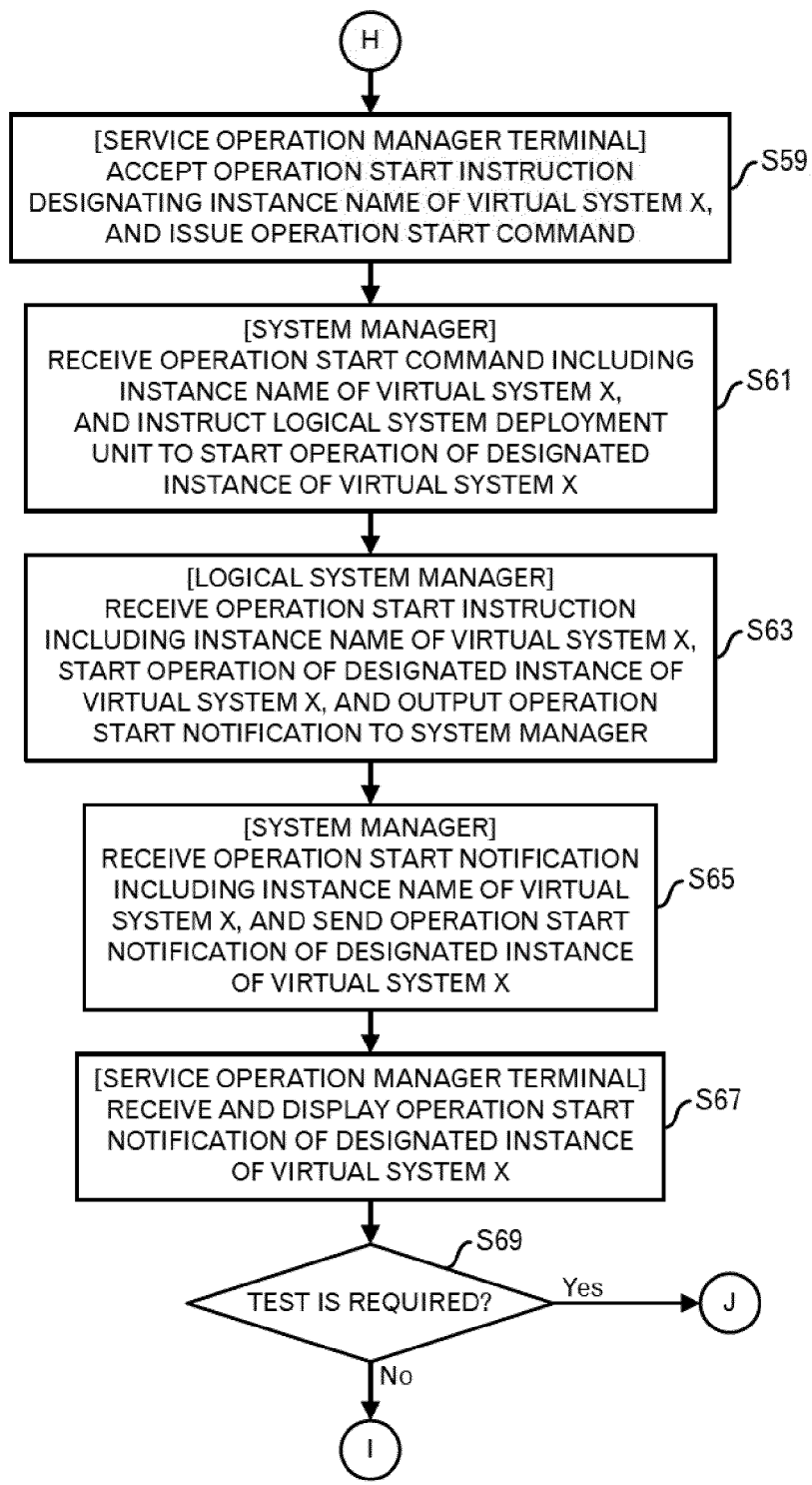
FIG. 20 is a diagram depicting a processing flow in the embodiment.

Shifting to the explanation of the processing of FIG. 20, the service operation manager inputs an operation start instruction designating the instance name of the virtual system X into the service operation manager terminal 1. The service operation manager terminal 1 accepts the operation start instruction designating the instance name of the virtual system X, and issues an operation start command including the instance name of the virtual system X to the virtual system deployment and test control apparatus 3 (step S59). The system manager 32 of the virtual system deployment and test control apparatus 3 receives the operation start command including the instance name of the virtual system X from the service operation manager terminal 1 through the I/F 31, and instructs the logical system deployment unit 37 to start the operation of the designated instance of the virtual system X (step S61).

The logical system deployment unit 37 receives the operation start instruction including the instance name of the virtual system X from the system manager 32, starts the operation of the designated instance of the virtual system X, and outputs an operation start notification including the instance name of the virtual system X to the system manager 32 (step S63). Incidentally, the processing itself for the operation start is the same as the conventional arts. Therefore, the further explanation is omitted. For example, a process (e.g. httpd, ftpd or the like) for accepting a processing request from the outside network is activated. In addition, the state of the pertinent record in the system deployment state table 38 is changed to "in service".

The system manager 32 receives the operation start notification including the instance name of the virtual system X from the logical system deployment unit 37, and transmits the operation start notification including the instance name of the virtual system X to the service operation manager terminal 1 (step S65). The service operation manager terminal 1 receives the operation start notification including the instance name of the virtual system X from the virtual system deployment and test control apparatus 3, and displays the notification onto the display device (step S67). Thus, the service operation manager can grasp that the operation of the virtual system X begins without any problem.

Thus, when the operation test is automatically executed and there is no problem in the operation test, the operational system is automatically deployed and the service starts. In addition, because almost all of the processing is automatically carried out, the mis-operation of the service operation manager hardly occur. Incidentally, the interaction processing (steps S55 to S59) with the service operation manager may be omitted, and the operation of the virtual system may automatically be carried out after passing the operation test.

After that, when the conversion from the operational system to any one of the test types of the test system is further conducted and the test is conducted (step S69: Yes route), the processing shifts to a processing of FIG. 26 through a terminal J. On the other hand, when any test is not carried out (step S69: No route), the processing shifts to a processing of FIG. 27 through a terminal I because the dismantlement is carried out.

Figure 21:
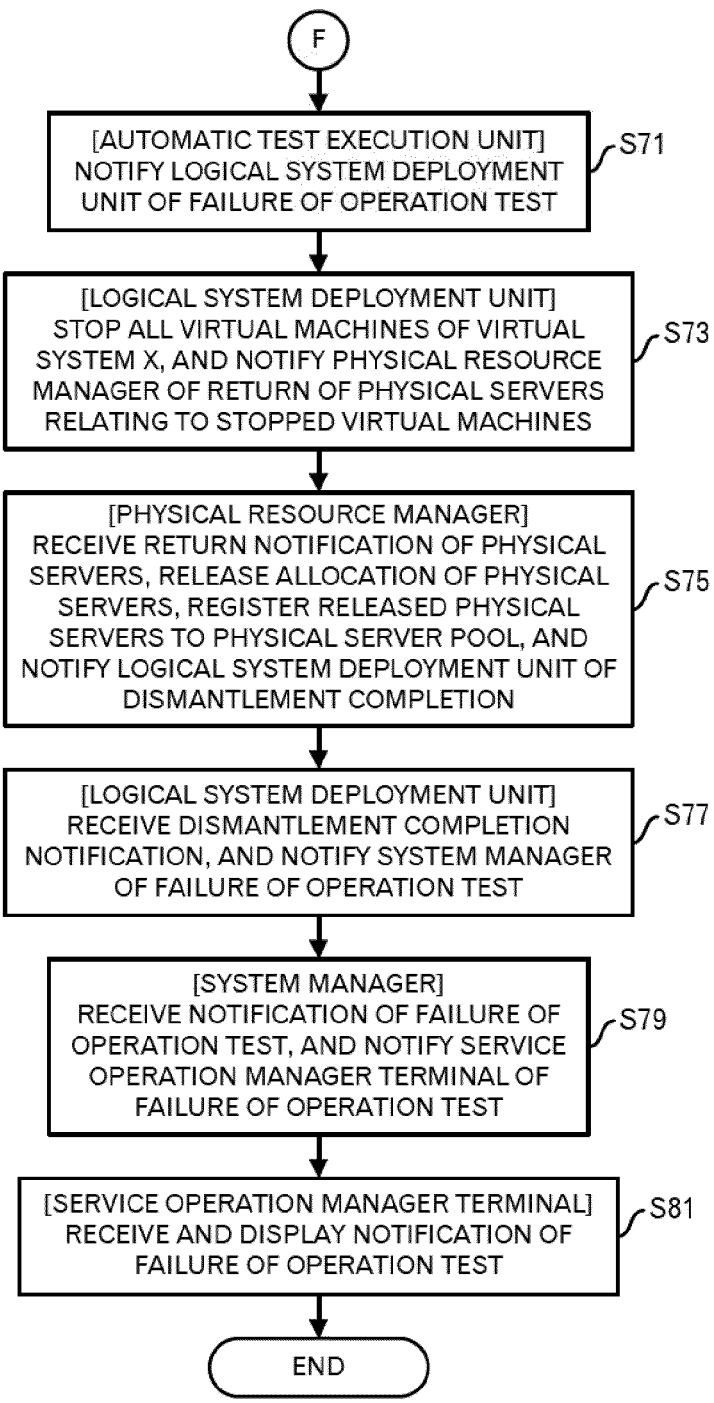
FIG. 21 is a diagram depicting a processing flow in the embodiment.
Figure 22:
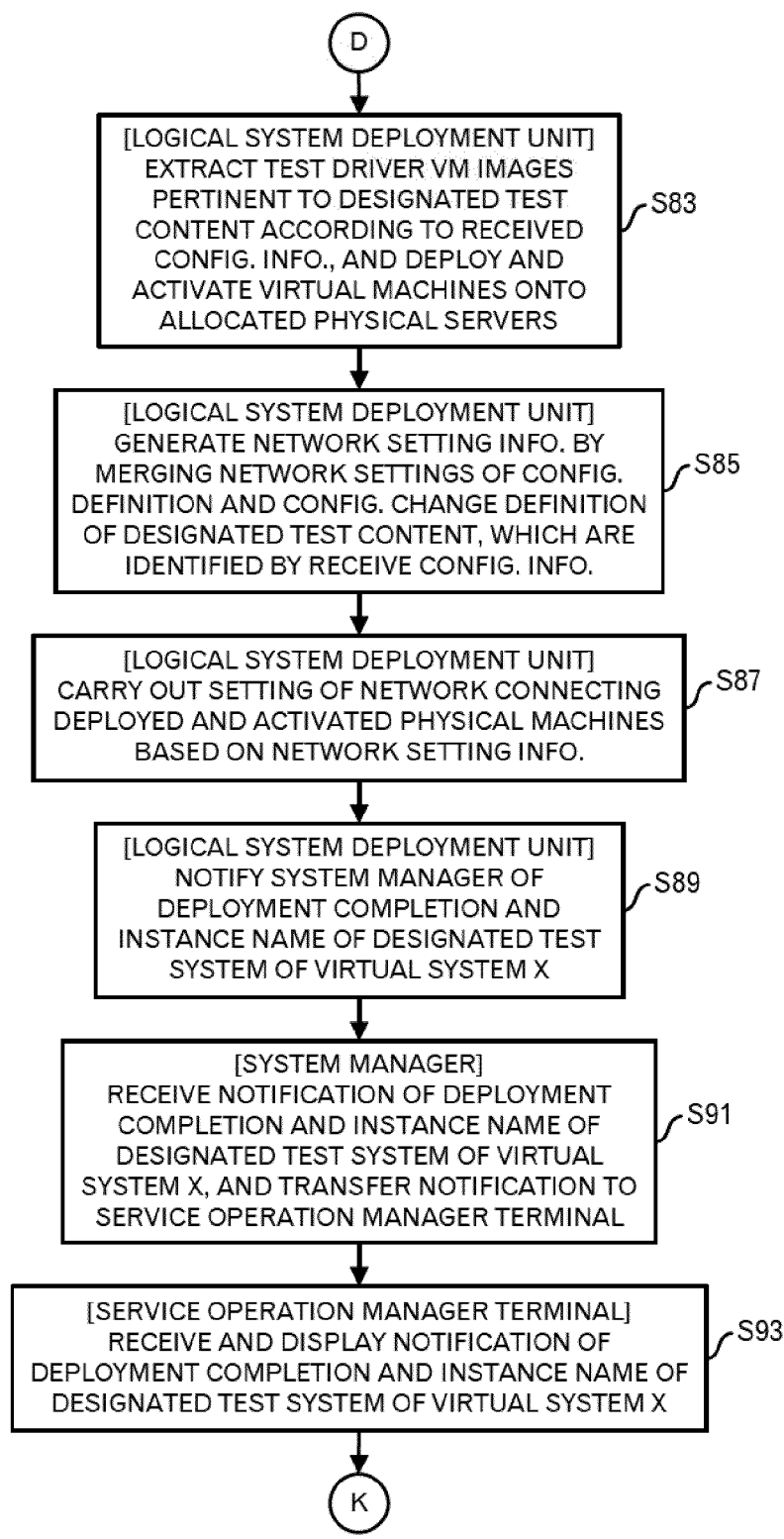
FIG. 22 is a diagram depicting a processing flow in the embodiment.
Figure 23:
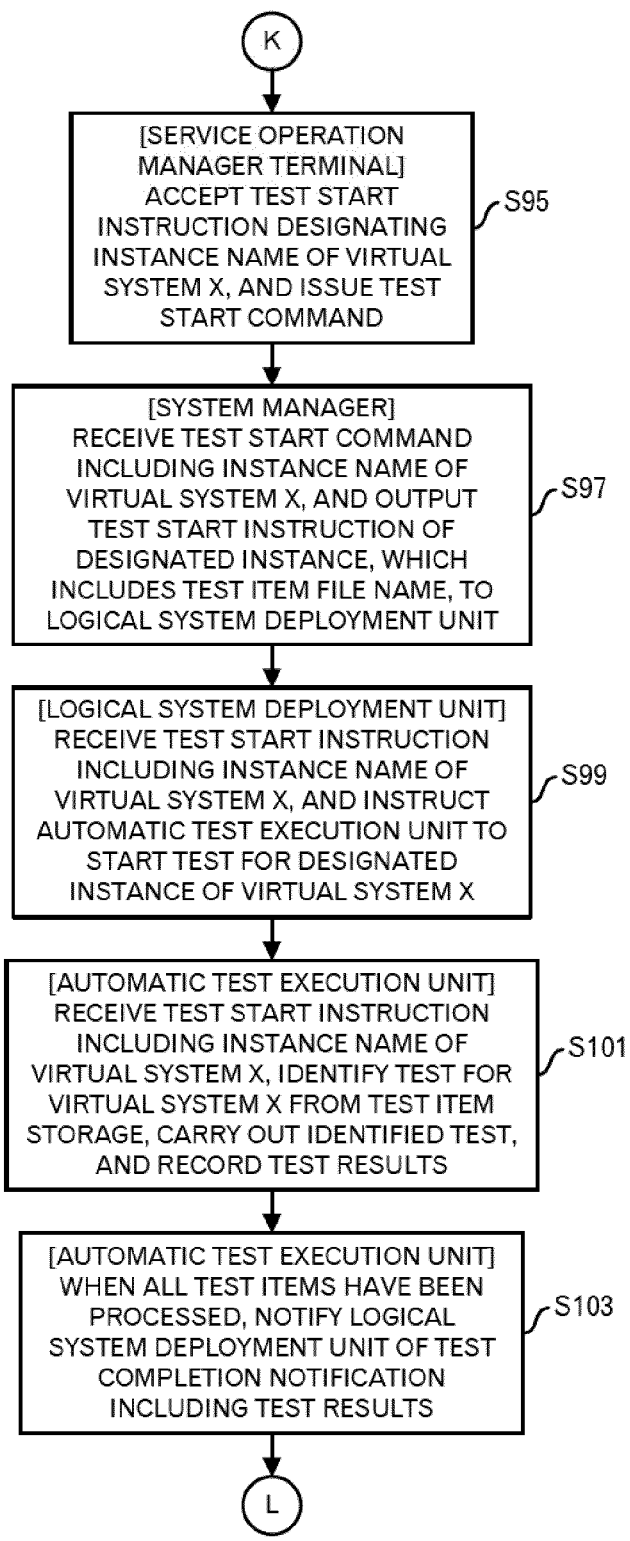
FIG. 23 is a diagram depicting a processing flow in the embodiment.
Figure 24:
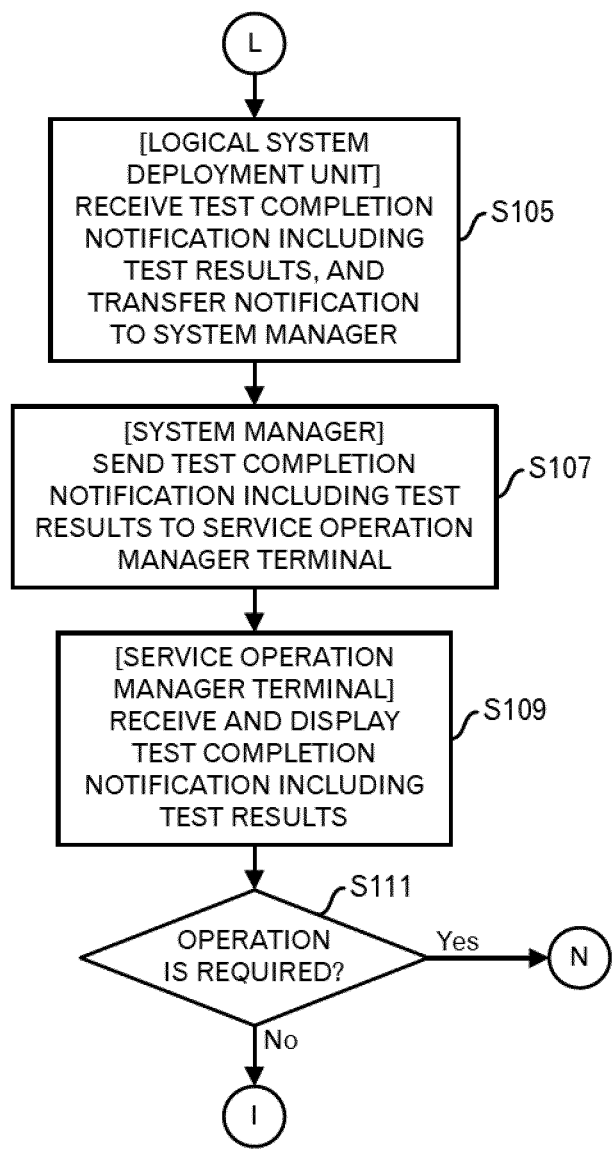
FIG. 24 is a diagram depicting a processing flow in the embodiment.

Next, a processing when the operation test was not passed in FIG. 18 will be explained by using FIG. 21. In such a case, the automatic test execution unit 41 notifies the logical system deployment unit 37 of the disqualification of the operation test (step S71). The logical system deployment unit 37 receives the notification of the disqualification of the operation test from the automatic test execution unit 41, stops the virtual machines used in the operation test of the test system according to the virtual machine description section of the logical configuration change definition file for the operation test and the virtual machine description section of the logical configuration definition file, identifies the physical servers for the identified instance of the virtual system X in the system deployment state table 38, and notifies the physical resource manager 42 of the return of the pertinent physical servers (step S73). The processing to stop the virtual machines is the same as the conventional arts. Therefore, any further explanation is omitted. Incidentally, at this stage, the state of the pertinent record in the system deployment state table 38 is changed to "dismantling", for example.

The physical resource manager 42 receives the notification of the return of the physical servers from the logical system deployment unit 37, releases the allocation of the pertinent physical servers, registers the pertinent physical servers as being free into the physical server pool 5, and notifies the logical system deployment unit 37 of the dismantlement completion (step S75).

The log system deployment unit 37 receives the notification of the dismantlement completion from the physical resource manager 42, and notifies the system manager of the disqualification of the test (step S77). Here, the logical system deployment unit 37 deletes the pertinent record in the system deployment state table 38. The system manager 32 receives the notification of the disqualification of the operation test from the logical system deployment unit 37, and transmits the notification of the disqualification of the operation test to the service operation manager terminal 1 through the I/F 31 (step S79). The service operation manager terminal 1 receives the notification of the disqualification of the operation test from the virtual system deployment and test control apparatus 3, and displays the notification onto the display device (step S81). Thus, the service operation manager can grasp the disqualification of the operation test. When the notification of the disqualification of the operation test includes the test results, it is possible to grasp reasons of the disqualification.

Figure 16:
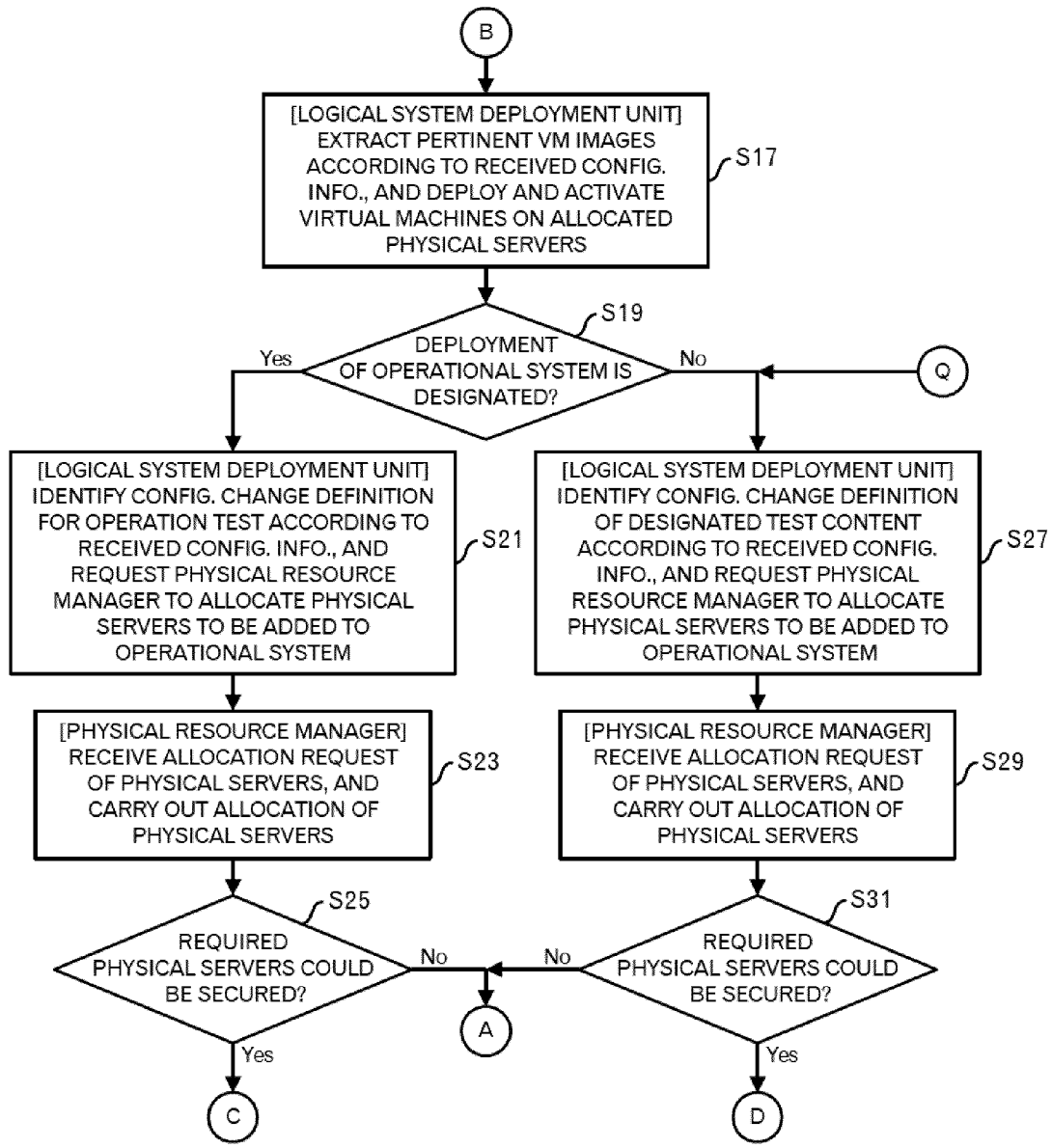
FIG. 16 is a diagram depicting a processing flow in the embodiment.

Next, a processing when the required number of physical servers could be secured at the step S31 of FIG. 16 will be explained by using FIGS. 22 to 25. The logical system deployment unit 37 extracts the pertinent test driver VM image files from the test driver VM image repository 39 according to the file names of the test driver VM image files, which are included in the received configuration information, and deploys and activates the virtual machines by loading the test driver VM images onto the allocated physical servers according to the virtual machine description section of the logical configuration change definition file (step S83).

Thus, when the test system is deployed, after the virtual machines of the operational system are deployed and activated, the virtual machines additionally necessary for the test system are deployed and activated. Therefore, at the stage when the test system can be deployed, a state has already been obtained that the operational system can be deployed. Therefore, when there is no problem in the test system, it is possible to convert the virtual system from the test system to the operational system immediately.

Furthermore, the logical system deployment unit 37 merges the network setting description section of the logical configuration definition file identified from the received configuration information and the network setting description section of the logical configuration change definition file to generate the network setting information for the designated test type of the test system, and stores the generated network setting information into the storage device such as the main memory (step S85).

Then, the logical system deployment unit 37 carries out the settings of the network for the deployed and activated virtual machines based on the network setting information generated at the step S85 (step S87). By doing so, the logical system 51 of the target test type of the test system has been constructed on the physical server pool 5. Therefore, the state of the pertinent record in the system deployment state table 38 is changed to the "deployed", for example. Incidentally, the details of this processing is the same as the conventional arts. Therefore, the further explanation is omitted.

Then, the logical system deployment unit 37 notifies the system manager 32 of the deployment completion and the instance name of the virtual system X (step S35). The system manager 32 receives the notification of the deployment completion and the instance name of the virtual system X from the logical system deployment unit 37, and transfers the notification to the service operation manager terminal 1 through the I/F 31 (step S37). The service operation manager terminal 1 receives the notification of the deployment and the instance name of the virtual system X from the virtual system deployment and test control apparatus 3, and displays the notification on the display device (step S39). Thus, the service operation manager can grasp that the preparation has been completed. The processing shifts to a processing of FIG. 23 through a terminal K.

In case of the deployment completion of the test system, the service operation manager inputs a test start instruction designating the instance name of the virtual system X to the service operation manager terminal 1. The service operation manager terminal 1 accepts the test start instruction, and issues a test start command to the virtual system deployment and test control apparatus 3 (step S43).

The system manager 32 of the virtual system deployment and test control apparatus 3 receives the test start command including the instance name of the virtual system X through the I/F 31, and outputs to the logical system deployment unit 37, a test start instruction for the designated instance of the virtual system X (step S97).

The logical system deployment unit 37 receives the test start instruction including the instance name of the virtual system. X, and outputs to the automatic test execution unit 41, the test start instruction for the designated instance of the virtual system X, which includes the file name of the test item file (step S47). The file name of the test item file is included in the configuration information extracted at the step S3. The automatic execution unit 41 receives the test start instruction including the file name of the test item file and the instance name of the virtual system. X, receives the test item file of the designated file name from the test item storage 40, carries out the test for the test system identified by the designated instance name according to the test item file, and stores the test results into the storage device such as the main memory (step S49). The performance itself of the test according to the test item file is the same as the conventional arts. Therefore, any further explanation is omitted. Incidentally, in the system deployment state table 38, the state in the pertinent record is changed to "in test".

Then, the automatic test execution unit 41 outputs to the logical system deployment unit 37, a test completion notification including the test results, when all of the test items have been processed (step S103). The processing shifts to a processing of FIG. 24 through a terminal L.

The logical system deployment unit 37 receives the test completion notification including the test results from the automatic test execution unit 41, and transfers the notification to the system manager 32 (step S105). The system manager 32 receives the test completion notification including the test results from the logical system deployment unit 37, and transmits the test completion notification including the test results through the I/F 31 to the service operation manager terminal 1 (step S107). The service operation manager terminal 1 receives the test completion notification including the test results from the virtual system deployment and test control apparatus 3, and displays the notification on the display device (step S109). Thus, the service operation manager can judges the test results and carries out the countermeasure.

Based on the circumstances, when converting to the operational system (step S111: Yes route), the processing shifts to a processing of FIG. 26 through a terminal N. On the other hand, when the dismantlement is carried out (step S111: No route), the processing shifts to a processing of FIG. 27 through a terminal I.

Figure 25:
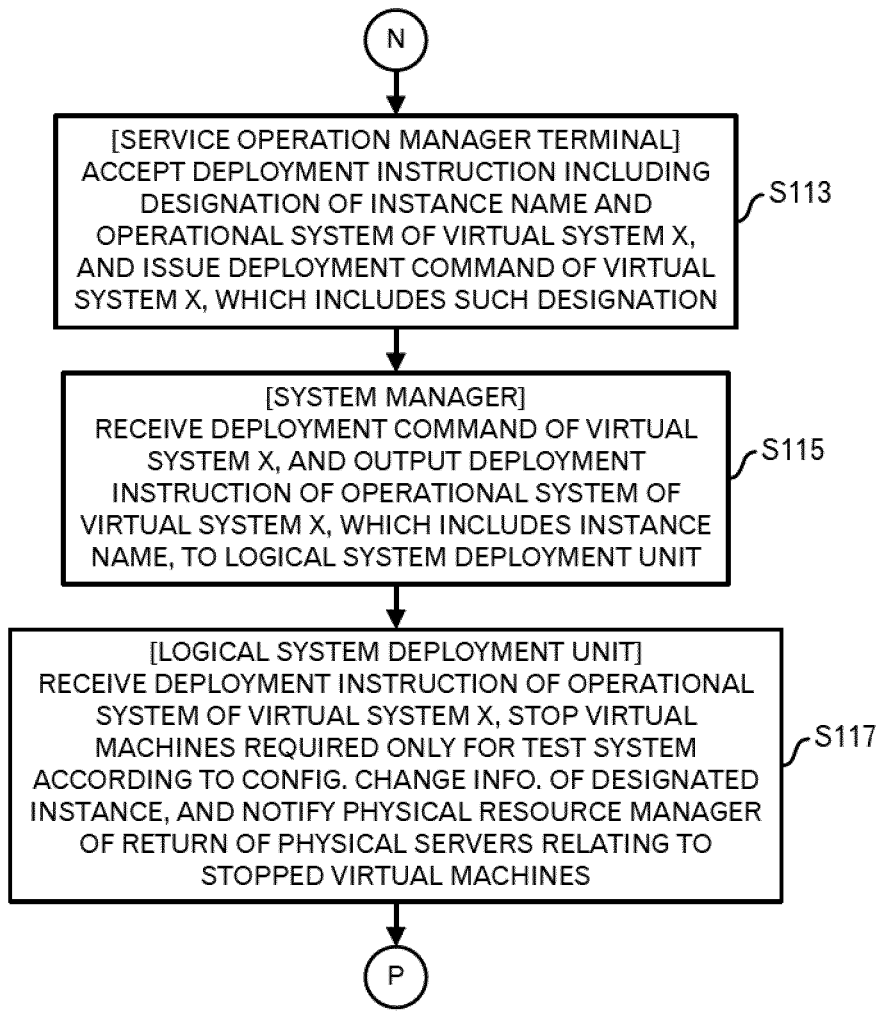
FIG. 25 is a diagram depicting a processing flow in the embodiment.

Shifting to the explanation of the processing of FIG. 25, the service operation manager designates the instance name of the virtual system and the operational system to input a deployment instruction into the service operation manager terminal 1, and the service operation manager terminal 1 accepts the deployment instruction including designation of the instance name of the virtual system X and the operational system, and issues a deployment command of the virtual system X, which includes such designation, to the virtual system deployment and test control apparatus 3 (step S113).

The system manager 32 receives the deployment command including the designation of the instance name of the virtual system X and the operational system, recognizes system switching because the instance name is designated, and outputs a deployment instruction of the operational system of the virtual system X, which includes the designated instance name, to the logical system deployment unit 37 (step S115).

The logical system deployment unit 37 receives the deployment instruction of the virtual system X, which includes the designated instance name, from the system manager 32, identifies and stops the virtual machines required only for the test system that has been deployed, according to the virtual machine description section of the configuration change definition file for the designated instance, and notifies the physical resource manager 42 of the return of the physical servers relating to the stopped virtual machines (step S117). The processing shifts to the step S49 of FIG. 18 through a terminal P. Thus, the network setting is carried out again, and the operational system is deployed.

Thus, the conversion from the test system to the operational system can be carried out. Furthermore, because it is unnecessary for the service operation manager to made detailed settings, the mis-operation can be excluded.

Figure 26:
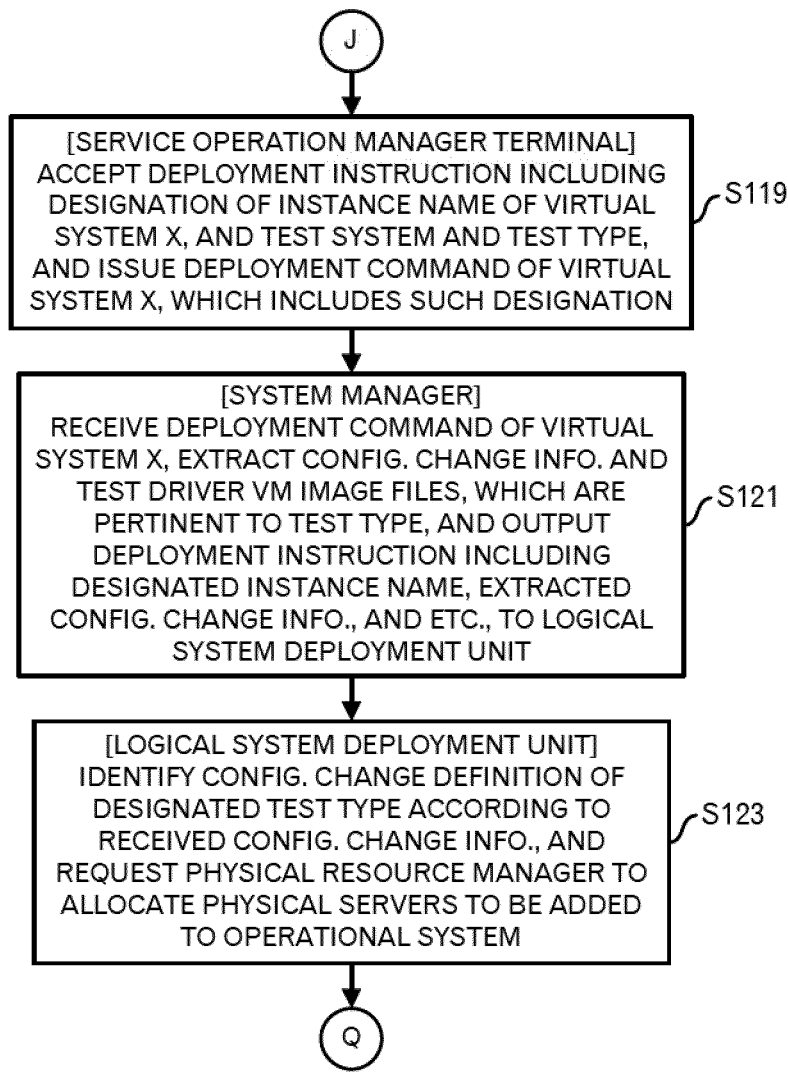
FIG. 26 is a diagram depicting a processing flow in the embodiment.

Next, a processing when converting from the operational system to the test system after the operation of the operational system starts (i.e. after the terminal J) will be explained by using FIG. 26. The service operation manager designates the instance name of the virtual system X and the test system and the test type to input the deployment instruction, and the service operation manager terminal 1 accepts the deployment instruction including the designation of the instance name of the virtual system X and the test system and the test type, and issues a deployment command of the virtual system X, which includes the designation, to the virtual system deployment and test control apparatus 3 (step S119).

The system manager 32 receives the deployment command including the designation of the instance name of the virtual system X and the test system and the test type from the service operation manager terminal 1, recognizes the system switching to the test system from the designation of the instance name, extracts, from the system management table 33, the file name of the logical configuration change definition file, the filenames of the test driver VM image files and the file name of the test item file, which correspond to the designated test type, and outputs to the logical system deployment unit 37, the deployment instruction for the test system of the virtual system X, which includes the designated instance name and the extracted data (i.e. the file name of the logical configuration change definition file, the file names of the test driver VM image files and the file name of the test item file) (step S121).

The deployment system deployment unit 37 receives the deployment instruction of the virtual system X, which includes the designated instance name, the file name of the logical configuration change definition file, the file names of the test driver VM image files and the file name of the test item file, reads out the logical configuration change definition file according to the file name of the logical configuration change definition file from the system logical configuration change storage 36, identifies the number of physical servers to be added to the operational system, and requests the physical resource manager 42 to allocate the required number of physical servers (step S123). Here, in the record for the designated instance name in the system deployment state table 38, the instance name is changed to "X-test (security test)", for example, and the state is changed to "deploying", for example. Then, the processing shifts to a processing of the step S27 of FIG. 16 through the terminal Q.

By carrying out the aforementioned processing, it is possible to switch the virtual system from the operational system to the test system of the designated test type.

Figure 27:
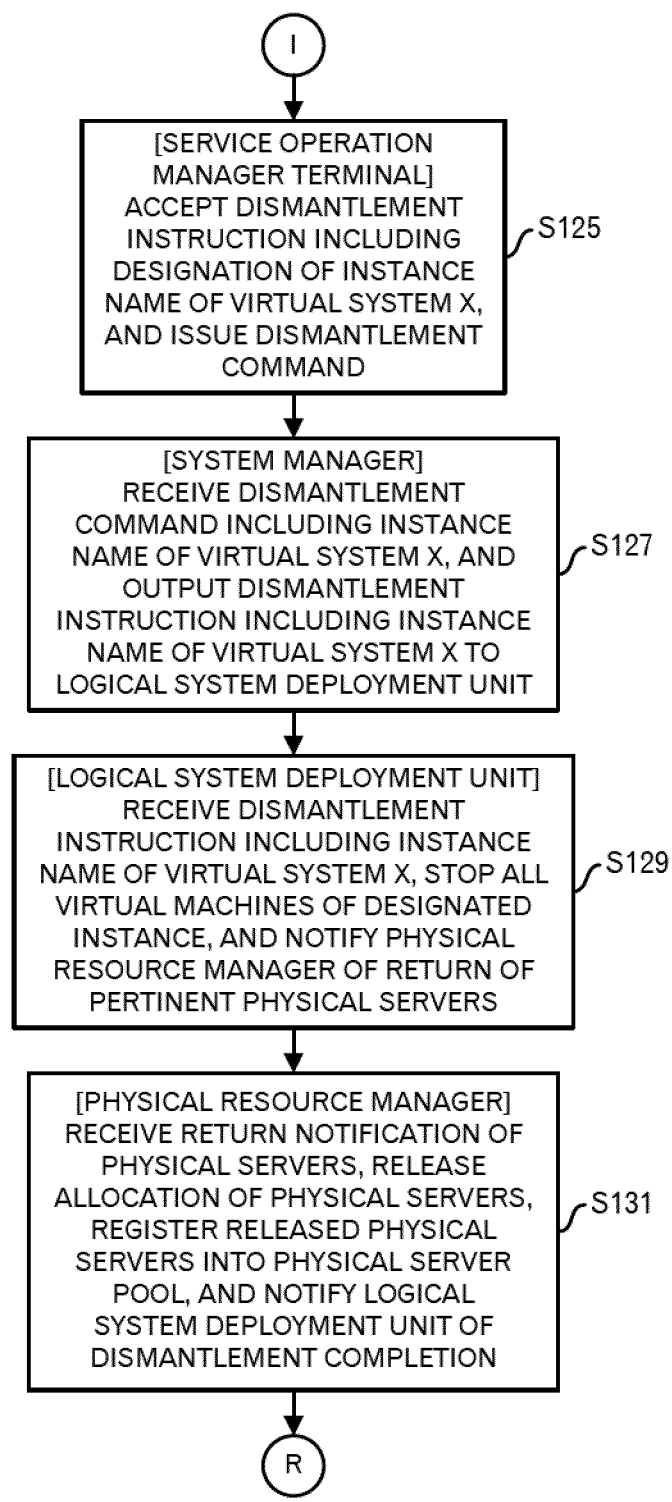
FIG. 27 is a diagram depicting a processing flow in the embodiment.
Figure 28:
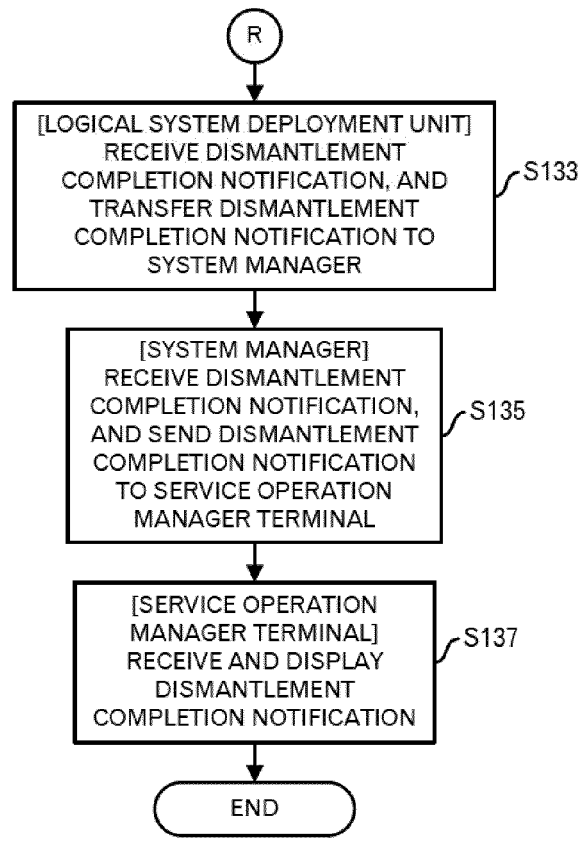
FIG. 28 is a diagram depicting a processing flow in the embodiment.

For example, after the test is completed, or when the operation is stopped due to the maintenance or the like, the processing of FIG. 27 is carried out. First, the service operation manager designates the instance name of the virtual system X to the service operation manager terminal 1 to input a dismantlement instruction. The service operation manager terminal 1 accepts the dismantlement instruction including designation of the instance name of the virtual system X, and issues a dismantlement command including the instance name of the virtual system X to the virtual system deployment and test control apparatus 3 (step S125).

The system manager 32 receives the dismantlement command including the instance name of the virtual system X from the service operation manager terminal 1, and outputs the dismantlement instruction including the instance name of the virtual system X to the logical system deployment unit 37 (step S127). The logical system deployment unit 37 receives the dismantlement instruction including the instance name of the virtual system X from the system manager 32, stops all of the virtual machines for the designated instance, identifies the physical servers for the designated instance of the virtual system X in the system deployment state table 38, and notifies the physical resource manager 42 of the return of the pertinent physical servers (step S129). The processing to stop the virtual machines is the same as the conventional arts. Therefore, any further explanation is not explained. Incidentally, here, in the system deployment state table 38, the state in the pertinent record is changed to "in dismantling", for example.

The physical resource manager 42 receives a return notification of the physical servers from the logical system deployment unit 37, releases the allocation of the physical servers, registers the released physical servers as being free physical servers, to the physical server pool 5, and notifies the logical system deployment unit 37 of the dismantlement completion (step S131). The processing shifts to a processing of FIG. 28 through a terminal R.

The logical system deployment unit 37 receives the notification of the dismantlement completion from the physical resource manager 42, and transfers the notification of the dismantlement completion to the system manager 32 (step S133). Here, the logical system deployment unit 37 deletes the pertinent record in the system deployment state table 38. The system manager 32 receives the notification of the dismantlement completion from the logical system deployment unit 37, and transmits the notification of the dismantlement completion to the service operation manager terminal 1 through the I/F 31 (step S135). The service operation manager terminal 1 receives the notification of the dismantlement completion from the virtual system deployment and test control apparatus 3, and displays the notification onto the display device (step S137). By doing so, the service operation manager can grasp the dismantlement completion.

As described above, by carrying out this embodiment, it becomes possible to deploy the test system according to the designated test type and to carry out the test. In addition, the switching between the test system and the operational system can be easily conducted. Because the inputs required at the switching are limited to the minimum, it is possible to suppress the occurrence of the human problems such as the setting mistakes. Furthermore, because the operational system goes into the actual operation only when there is no problem in the operation test that is automatically executed, it is possible to prevent the problems from happening in the actual operation.

In addition, because the physical server pool is shared, the possibility that the trouble due to the fine difference between versions of the software in the physical servers can be avoided is high.

Although the embodiment of this technique was explained, this technique is not limited to this embodiment. For example, the data management method in the virtual system deployment and test control apparatus 3 is not limited to the method depicted in FIG. 4. In addition, the functional configuration in the virtual system deployment and test control apparatus 3 is not also limited to the block diagram of FIG. 4, and the program module configuration does not match with the actual program module configuration. For example, a controller in which the system manager 32, the logical system deployment unit 37 and the physical resource manager 42 are integrated into one module may be provided.

In addition, as long as the processing results of the processing flows do not change, the order of the steps may be changed and the steps may be executed in parallel. And as long as the aforementioned processing can be carried out, the data format used in the processing may be changed.

Figure 29:
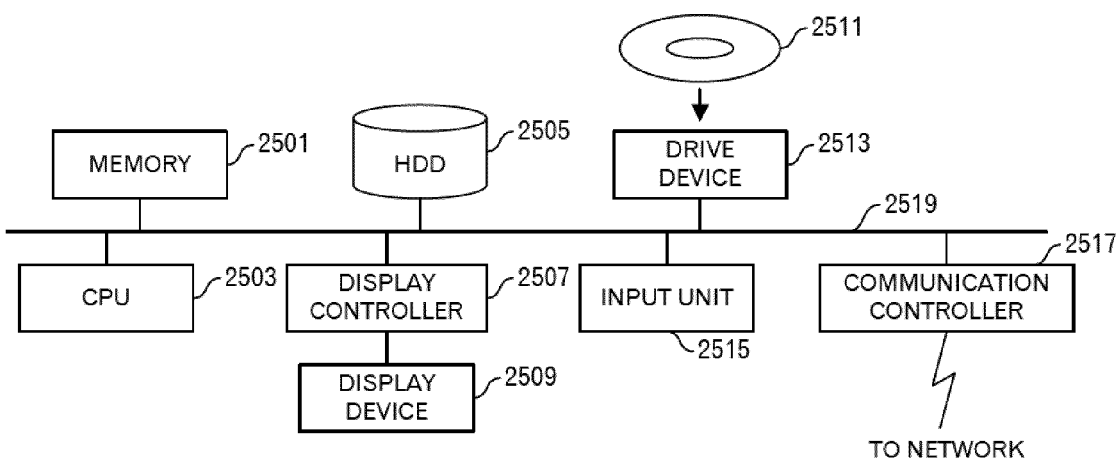
FIG. 29 is a functional block diagram of a computer.

In addition, the physical server in the physical server pool, the service operation manager terminal 1 and the virtual system deployment and test control apparatus 3 are computer devices as shown in FIG. 29. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 29. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

This embodiment can be outlined as follows:

According to a first viewpoint of this embodiment, a virtual system control method includes: receiving a deployment request for requesting to deploy a specific type of a test system for a specific virtual system in a physical server pool in which operational and test virtual systems can be deployed; activating a virtual machine necessary for the operational system of the specific virtual system in the physical server pool by using first server configuration data in configuration information for the operational system of the specific virtual system and a first virtual machine image for the operational system of the specific virtual system; activating a virtual machine to be added to the operational system of the specific virtual system in the physical server pool by using second server configuration data in configuration change information representing configuration information concerning difference between the operational system and the specific type of the test system for the specific virtual system and a second virtual machine image for the virtual machine relating to the difference; and carrying out a setting of a network connecting the activated virtual machines according to network configuration data generated by merging first network setting information between the virtual machines in the configuration information for the operational system of the specific virtual system and second network setting information that represents difference on the network between the operational system and the specific type of the test system for the specific virtual system and is included in the configuration change information.

By defining the test system as difference with the operational system after defining the operational system, it is possible to convert the virtual system to the operational system easily and promptly, when the test for the test system was passed. Incidentally, also in case where plural test types exist, it also becomes possible to carry out only one or more designated tests.

According to a second viewpoint of this embodiment, a virtual system control method includes: receiving a deployment request for requesting to deploy an operational system of a specific virtual system in a physical server pool in which the operational and test virtual systems are deployable; activating a virtual machine necessary for the operational system of the specific virtual system in the physical server pool by using first server configuration data in configuration information for the operational system of the specific virtual system and a first virtual machine image for the operational system of the specific virtual system; activating a virtual machine to be added to the operational system of the specific virtual system in the physical server pool by using second server configuration data in configuration change information representing configuration information concerning difference between the operational system and the specific type of the test system to be tested immediately before the operational system works and a second virtual machine image for the virtual machine relating to the difference; carrying out a setting of a network connecting the activated virtual machines according to network configuration data generated by merging first network setting information between the virtual machines in the configuration information for the operational system of the specific virtual system and second network setting information that represents difference on the network between the operational system and the specific type of the test system for the specific virtual system and is included in the configuration change information; and carrying out a specific test for the specific type of the test system for the specific virtual system; upon detecting that there is no problem in the specific test, stopping the activated virtual machines according to the first server configuration data included in the configuration change information, and returning the physical servers relating to the stopped virtual machines to the physical server pool; and carrying out a second setting of a network connecting the virtual machines that are still activated, according to the first network setting information in the configuration information.

Thus, also in case where the operational system is deployed, the operational system is deployed after the test system for the test to be carried out immediately before the actual operation starts is deployed and the test is conducted, and the reliability of the operation in the operational system is improved. Incidentally, although it is described above, it is possible to easily and promptly convert the virtual system to the operational system by defining the test system as difference with the operational system.

Incidentally, the aforementioned activating the virtual machine necessary for the operational system may include: identifying the configuration information for the operational system of the specific virtual machine relating to the deployment request; securing the first physical machines that can be deployed in the physical server pool according to the first server configuration data included in the identified configuration information; and identifying the first virtual machine images for the operational system of the specific virtual system, and activating virtual machines on the secured first physical servers by using the identified first virtual machine images.

Furthermore, the activating the virtual machine to be added may include: identifying the configuration change information for the specific type of the test system for the specific virtual system; securing second physical servers that can be deployed in the physical server pool according to the second server configuration data included in the configuration change information for the specific type of the test system for the specific virtual system; and identifying the second virtual machine images for the virtual machines relating to difference between the operational system and the specific type of the test system, and activating the virtual machines on the secured second physical servers.

Furthermore, the aforementioned carrying out a setting of the network connecting the activated virtual machines may include: deleting, from the first network setting information included in the configuration information, items to be deleted, among items in the second network setting information included in the configuration change information, and adding to the first network setting information included in the configuration information, items to be added, among items in the second network configuration information included in the configuration change information.

The virtual system control method according to the second viewpoint may further include: receiving a second deployment request for requesting to deploy a second type of the test system of the specific virtual system; activating the virtual machines to be added to the operational system of the specific virtual system in the physical server pool, by using third server configuration data in second configuration change information that represents the configuration information concerning difference between the operational system and the second type of the test system and third virtual machine images for the virtual machines relating to the difference; and carry out a third setting of the network connecting the activated virtual machines according to the second network configuration data generated by merging the first network setting information in the configuration information and third network setting information that represents difference on the network between the operational system and the second type of the test system and is included in the second configuration change information.

Thus, it is possible to easily switch the virtual system from the operational system to the test system.

Furthermore, the virtual system control method according to the first viewpoint may further include: carrying out a test for the specific type of the test system to the specific type of the test system of the specific virtual system; receiving a second deployment request for requesting to deploy the operational system of the specific virtual system in the physical server pool; stopping the activated virtual machines according to the second server configuration data in the configuration change information, and returning the physical servers relating to the stopped virtual machines to the physical server pool; and carrying out a second setting of the network connecting the virtual machines that are still activated according to the first network setting information in the configuration information.

Thus, it becomes possible to easily switch from the test system to the operational system.

A virtual system control apparatus according to a third viewpoint includes: a configuration information storage device to store configuration information for an operational system of a virtual system; a first virtual machine image storage device to store first virtual machine images for the operational system of the virtual system; a configuration change information storage device to store configuration change information that represents configuration information concerning difference between the operational system of the virtual system and plural types of test systems; a second virtual machine image storage device to store second virtual machine images for a virtual machine relating to the difference; and a controller to carry out the aforementioned first or second viewpoint.

By adopting data configuration of the operational system and data configuration of the test system, it becomes possible to easily and smoothly switch between the operational system and the specific test type of the test system.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a computer to execute a virtual system control process, the virtual system control process comprising:

receiving a deployment request for requesting to deploy a specific type of a test system for a specific virtual system in a physical server pool in which operational and test virtual systems can be deployed;

first activating plural types of virtual machines necessary for said operational system of said specific virtual system in said physical server pool by using first server configuration data in configuration information for said operational system of said specific virtual system and a first virtual machine image for said operational system of said specific virtual system;

second activating plural types of virtual machines to be added to said operational system of said specific virtual system in said physical server pool by using second server configuration data in configuration change information representing configuration information concerning difference between said operational system and said specific type of said test system for said specific virtual system and a second virtual machine image for the virtual machine relating to said difference, said plural types of virtual machines to be added to said operational system play additional roles to roles which said plural types of virtual machines necessary for said operational system play;

identifying a first link that is included in a network of said operational system and is not included in a network of said specific type of said test system, and a second link that is not included in said network of said operational system and is included in said network of said specific type of said test system, by using said configuration change information; and setting said first link to be deleted from said operational system and said second link to be added to said operational system.

2. The computer-readable, non-transitory storage medium as set forth in claim 1, wherein the virtual system control process further comprises:

carrying out a test for said specific type of said test system to said specific type of said test system of said specific virtual system;

receiving a second deployment request for requesting to deploy said operational system of said specific virtual system in said physical server pool;

stopping the activated virtual machines according to said second server configuration data in said configuration change information, and returning said physical servers relating to the stopped virtual machines to said physical server pool; and setting said second link to be deleted from said specific type of said test system and said first link to be added to said specific type of said test system.

3. A computer-readable, non-transitory storage medium storing a program for causing a computer to execute a virtual system control process, the virtual system control process comprising:

receiving a deployment request for requesting to deploy an operational system of a specific virtual system in a physical server pool in which operational and test virtual systems can be deployed;

first activating plural types of virtual machines necessary for said operational system of said specific virtual system in said physical server pool by using first server configuration data in configuration information for said operational system of said specific virtual system and a first virtual machine image for said operational system of said specific virtual system;

second activating plural types of virtual machines to be added to said operational system of said specific virtual system in said physical server pool by using second server configuration data in configuration change information representing configuration information concerning difference between said operational system and a specific type of said test system to be tested immediately before said operational system works and a second virtual machine image for the virtual machine relating to said difference, said plural types of virtual machines to be added to said operational system play additional roles to roles which said plural types of virtual machines necessary for said operational system play;

identifying a first link that is included in a network of said operational system and is not included in a network of said specific type of said test system, and a second link that is not included in said network of said operational system and is included in said network of said specific type of said test system, by using said configuration change information;

setting said first link to be deleted from said operational system and said second link to be added to said operational system;

carrying out a specific test for said specific type of said test system to said specific virtual system;

upon detecting that there is no problem in said specific test, stopping the activated virtual machines according to said second server configuration data included in said configuration change information, and returning said physical servers relating to the stopped virtual machines to said physical server pool; and setting said second link to be deleted from said specific type of said test system and said first link to be added to said specific type of said test system.

4. The computer-readable, non-transitory storage medium as set forth in claim 3, wherein said first activating comprises:
identifying said configuration information for said operational system of said specific virtual system relating to said deployment request;
securing first physical machines that can be deployed in said physical server pool according to said first server configuration data included in the identified configuration information; and
identifying said first virtual machine images for said operational system of said specific virtual system, and activating said plural types of virtual machines on the secured first physical servers by using the identified first virtual machine images.

5. The computer-readable, non-transitory storage medium as set forth in claim 3, wherein said second activating comprises:
identifying said configuration change information for said specific type of said test system for said specific virtual system;
securing second physical servers that can be deployed in said physical server pool according to said second server configuration data included in said configuration change information for said specific type of said test system for said specific virtual system; and
identifying said second virtual machine images for the virtual machine relating to said difference between said operational system and said specific type of said test system, and activating the plural types of virtual machines on said secured second physical servers by using the identified second virtual machine images.

6. The computer-readable, non-transitory storage medium as set forth in claim 3, wherein the virtual system control process further comprises:
receiving a second deployment request for requesting to deploy a second type of said test system of said specific virtual system;
third activating said virtual machines to be added to said operational system of said specific virtual system in said physical server pool, by using third server configuration data in second configuration change information that represents the configuration information concerning second difference between said operational system and said second type of said test system, and third virtual machine images for the virtual machine relating to said second difference;
identifying a third link that is included in a network of said operational system and is not included in a network of said second type of said test system, and a fourth link that is not included in said network of said operational system and is included in said network of said second type of said test system, by using said second configuration change information; and setting said third link to be deleted from said operational system and said fourth link to be added to said operational system.

7. A virtual system control apparatus, comprising:
a configuration information storage device to store configuration information for an operational system of a virtual system;
a first virtual machine image storage device to store first virtual machine images for said operational system of said virtual system;
a configuration change information storage device to store configuration change information that represents configuration information concerning difference between said operational system of said virtual system and plural types of test systems;
a second virtual machine image storage device to store second virtual machine images for virtual machines relating to said difference; and
a controller, and
wherein said controller activates plural types of virtual machines necessary for an operational system of a specific virtual system in a physical server pool in which said operational and test virtual systems can be deployed, by using first server configuration data in said configuration information identified from said configuration information storage device for said operational system of said specific virtual system and said first virtual machine image identified from said first virtual machine image storage device for said operational system of said specific virtual system, said controller activates plural types of virtual machines to be added to said operational system of said specific virtual system in said physical server pool by using second server configuration data in said configuration change information that represents the configuration information concerning difference between said operational system and a specific type of said test system to be tested immediately before said operational system works and is identified from said configuration change information storage device, and said second virtual machine image identified from said second virtual machine image storage device for the virtual machine relating to said difference between said operational system and said specific type of said test system, said plural types of virtual machines to be added to said operational system play additional roles to roles which said plural types of virtual machines necessary for said operational system play, said controller identifies a first link that is included in a network of said operational system and is not included in a network of said specific type of said test system, and a second link that is not included in said network of said operational system and is included in said network of said specific type of said test system, by using said configuration change information;

said controller sets said first link to be deleted from said operational system and said second link to be added to said operational system;

said controller carries out a specific test for said specific type of said test system to said specific virtual system, upon detecting that there is no problem in said specific test, said controller stops the activated virtual machines according to said second server configuration data included in the identified configuration change information, and returns said physical servers relating to the stopped virtual machines to said physical server pool, and said controller sets said second link to be deleted from said specific type of said test system and said first link to be added to said specific type of said test system.

* * * * *